US011850518B2

(12) United States Patent
Boatman et al.

(10) Patent No.: US 11,850,518 B2
(45) Date of Patent: Dec. 26, 2023

(54) GAMING FEATURES FOR AN ELECTRONIC GAME

(71) Applicant: Carbonated Inc., El Segundo, CA (US)

(72) Inventors: Travis Boatman, Manhattan Beach, CA (US); Christopher Carlson, Inglewood, CA (US); Frank Austin Keller, El Segundo, CA (US); Kolbe Launchbaugh, Redondo Beach, CA (US); Lloyd Tullues, Cedar Park, TX (US); Nikolaas Van Wonterghem, Los Angeles, CA (US)

(73) Assignee: Carbonated Inc., El Segundo, CA (US)

( * ) Notice: Subject to any disclaimer, the term of this patent is extended or adjusted under 35 U.S.C. 154(b) by 11 days.

(21) Appl. No.: 17/656,166

(22) Filed: Mar. 23, 2022

(65) Prior Publication Data

US 2022/0280873 A1  Sep. 8, 2022

Related U.S. Application Data

(63) Continuation of application No. 17/653,451, filed on Mar. 3, 2022.
(Continued)

(51) Int. Cl.
A63F 13/69 (2014.01)
A63F 13/825 (2014.01)
(Continued)

(52) U.S. Cl.
CPC ............ A63F 13/69 (2014.09); A63F 13/352 (2014.09); A63F 13/537 (2014.09); A63F 13/58 (2014.09); A63F 13/825 (2014.09); A63F 13/87 (2014.09)

(58) Field of Classification Search
CPC ...... A63F 13/69; A63F 13/352; A63F 13/825; A63F 13/87
See application file for complete search history.

(56) References Cited

U.S. PATENT DOCUMENTS

2007/0060231 A1  3/2007  Neveu et al.
2009/0149248 A1  6/2009  Busey et al.
(Continued)

FOREIGN PATENT DOCUMENTS

KR  10-2015-0055150  5/2015
WO  WO 2022/187555  9/2022

OTHER PUBLICATIONS

International Search Report and Written Opinion for PCT Application No. PCT/US2022/018798 dated Jun. 8, 2022 in 7 pages.

Primary Examiner — Yingchuan Zhang
(74) Attorney, Agent, or Firm — Perkins Coie LLP

(57) ABSTRACT

Systems and methods for providing a gaming system with particular features are provided herein. In particular, a gaming system can provide nested object packages. In some embodiments, the gaming system can monitor user monitoring service calls in third party platforms and implement associated features. In some embodiments, the gaming system can receive developer modifications and schedule multiple updates of the gaming system. In some embodiments, the gaming system can determine inter squad dynamics based on character traits. In some embodiments, the gaming system can provide modified game data to a first set of users and unmodified game data to a second set of users. In some embodiments, the gaming system can generate actions for groups of characters based on user swipes. In some embodiments, the gaming system can implement a player proxy for a player. In some embodiments, the gaming system can use search nodes and agents to map territories.

20 Claims, 16 Drawing Sheets

Related U.S. Application Data

(60) Provisional application No. 63/157,492, filed on Mar. 5, 2021.

(51) Int. Cl.
*A63F 13/352* (2014.01)
*A63F 13/87* (2014.01)
*A63F 13/537* (2014.01)
*A63F 13/58* (2014.01)

(56) References Cited

U.S. PATENT DOCUMENTS

| | | |
|---|---|---|
| 2009/0253517 A1 | 10/2009 | Bererton et al. |
| 2012/0021840 A1 | 1/2012 | Johnson et al. |
| 2012/0313320 A1 | 12/2012 | Hansen et al. |
| 2015/0149319 A1 | 5/2015 | Pattani et al. |
| 2018/0256981 A1 | 9/2018 | Enomoto |
| 2018/0304158 A1 | 10/2018 | Miyamae et al. |
| 2018/0350144 A1* | 12/2018 | Rathod .............. G06Q 20/3276 |
| 2022/0280872 A1 | 9/2022 | Boatman et al. |

* cited by examiner

GAMING FEATURES FOR AN ELECTRONIC GAME

INCORPORATION BY REFERENCE TO ANY PRIORITY APPLICATIONS

The present application is a continuation of U.S. patent application Ser. No. 17/653,451, filed Mar. 3, 2022, and entitled, GAMING FEATURES FOR AN ELECTRONIC GAME, which claims priority benefit to U.S. Provisional Application No. 63/157,492, filed Mar. 5, 2021, and entitled, GAMING FEATURES FOR AN ELECTRONIC GAME, each of which is hereby incorporated herein by reference in its entirety. Any and all applications for which a foreign or domestic priority claim is identified in the Application Data Sheet as filed with the present application are hereby incorporated by reference under 37 CFR 1.57.

BACKGROUND

Field

Some embodiments of the present disclosure are directed to systems and methods for implementing electronic games for a gaming system and enhancing gameplay.

Description

Use of electronic games has grown considerably over the last several decades, and has exploded in response to advances in technologies (e.g., upgrades to mobile gaming systems). Electronic games are games that can be implemented on computing devices. The use of computing devices allows for players to engage with the electronic games in a manner that may not have been previously achievable. For example, computing devices can allow a player to have access to the electronic game at any time. The electronic games may encourage players to access the electronic games more frequently by offering periodic rewards (for example, loot crates and the like) and the use of computing devices enables the player to take full advantage of these periodic rewards. Further, network-based electronic games may enable players to communicate and interact with other players who are using the game.

Numerous procedures may be used by a player to interact with an electronic game via a computing device. The computing device can cause images associated with the electronic game to be displayed on the computing device via a user interface. Further, the player can interact with the computing device using various controls offered by the computing device. For example, the computing device may provide a virtual joystick via a touchscreen of the computing device that allows a player to interact with the electronic game to move a corresponding character within the game.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The drawings are provided to illustrate example embodiments and are not intended to limit the scope of the disclosure. A better understanding of the systems and methods described herein will be appreciated upon reference to the following description in conjunction with the accompanying drawings, wherein.

DETAILED DESCRIPTION

Figure 1:
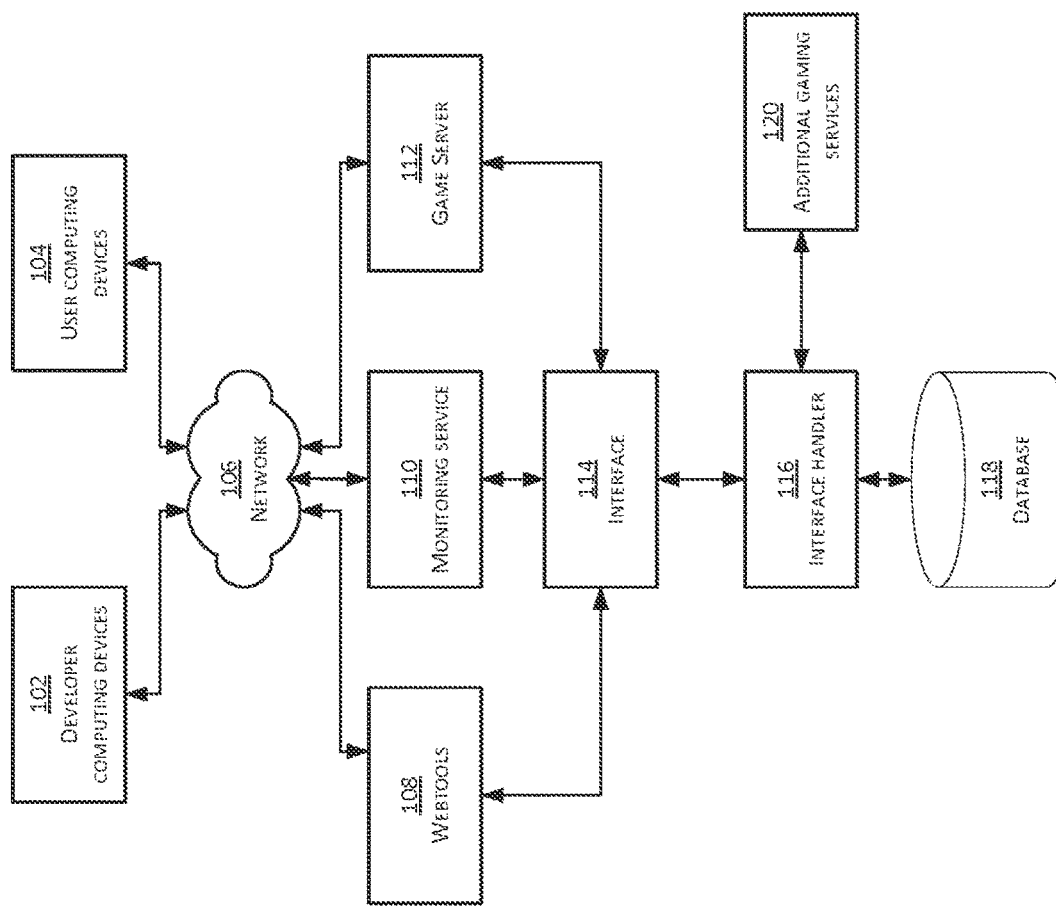
FIG. 1 depicts a schematic diagram of a system including a game server according to some embodiments herein.

Embodiments are described herein according to the following outline:
   1.0. General Overview
   2.0 System Overview
      2.1 Computing Devices
      2.2 Network
      2.3 Interface
      2.4 Database
      2.5 Webtools
      2.6 Monitoring Service
      2.7 Game Server
   3.0. Nested Object Packages
   4.0 User Monitoring Service
   5.0 Live Deployment Process 6.0 Personality Traits
7.0 Changesets
8.0 Swipe to Move
9.0 Grouping Characters
10.0 Player Proxy
11.0 Search Nodes
12.0 Additional Embodiments 1.0 General Overview Some embodiments herein are directed to an improved gaming system for facilitating a player's interactions with an electronic game in order to improve the experience of the player. The electronic game described herein is an example of an online game, such as a game in which one or more players utilize respective computing devices to control virtual game characters within a same game world of the online game. In some embodiments, the electronic game can be a mobile game, such as a mobile game that is implemented on a mobile computing device (e.g., a tablet, a cell phone, wearable electronics, etc.). Therefore, electronic games can be implemented on multiple computing devices and players can utilize respective computing devices in order to control virtual game characters (referred to herein as characters) and implement the game. The virtual game characters may be implemented within a virtual game world of a game application.

A game world can include thousands of objects that a virtual game character can interact with in order to traverse the game world. As will be described, an example system described herein (for example, the gaming server 508) can be in communication with the computing devices and establish a persistent game state associated with the game world. The players can therefore utilize the computing devices in order to communicate with the system. Therefore, each player may control respective characters, features, items, etc. within the same game world, for example, by interacting with a respective computing device in order to modify the same game world. Further, each player can cause actions to be performed in the same game world. For example, a player may cause a loot crate within the game world to be opened and a character controlled by the player may receive items within the loot crate. Further, the player can trade the items received from the loot crate to another player within the same game world. Therefore, the player can interact with the computing devices in order to modify/interact with the electronic game and the game data.

The present disclosure generally relates to a gaming system that makes it easy for users (for example, players) to interact with the game. The gaming system may include e computing devices (e.g., developer computing devices and/or user computing devices), a game server, and/or a database. The computing device may be in communication with a game server in order to execute the game over a network. The game server can read game data from a database in order to determine how to execute the game. For example, the game server can read game data (e.g., character state data, environment state data, game state, and/or other information associated with a game state) from the database. Based on the read game data, the game server can execute a multiplayer game for multiple players on multiple computing devices. For example, the game server can utilize the game data in order to execute the game (e.g., an instance of the game) and provision a game world via a computing device. Further, a user can interface with the game world via the computing device, in order to modify particular features of the game world. The user can provide, via the computing device, game data (e.g., environmental settings, constraints, skeleton models, routes, and/or other game application information) that modifies particular aspects of the game world (e.g., building a new character). The game data may then be stored in the database for use by the game server. The game data may include both developer game data and player game data and players and developers may each modify the game data and associated aspects of the game world. The modification of player game data may be based on calls received from the user computing devices. For example, a player may interact with the user computing devices to request the implementation of particular features (e.g., characters, territories, weapons, etc.) within a particular game world. Based on the requests received from the player, the computing device can generate a call and transmit the call to the game server which may then read the relevant game data and game state data from the database. Therefore, the computing devices can interact with the game server in order to execute the game.

In order to modify developer game data, developer computing devices (e.g., designer computing devices) may also be in communication with the database. For example, the developer computing devices can modify the developer game data to modify how the game is implemented. The developer computing devices can generate one or more service calls that modify the developer game data within the database. For example, the developer computing device can modify, add, or delete developer game data from the database (e.g., add game characters to the game, remove game characters from the game, create an event, or otherwise modify the game application information). The developer computing devices can interact with the database to modify the developer game data. Based on the modified developer game data, the developer game data read by the game server may be adjusted. Therefore, the developer computing devices can adjust the game that is implemented by the computing devices.

Typically, such user computing devices may be unable to modify the player game data stored in the database when outside of the game world. Instead, existing gaming systems can rely on developer computing devices to modify the developer game data. This can introduce a single point of failure as any modifications of the developer game data are reliant on a specific developer computing device being available to implement the change. Further, traditional gaming systems may be limited to providing fixed objects that the computing devices can interact with. For example, while traditional gaming systems may make territories, characters, events, weapons, etc. available to a computing device, the territories, characters, events, weapons, etc. may be fixed in nature. While a developer computing device may modify developer game data, when a computing device calls the game server to obtain the developer game data, the computing device may be limited to a specific version of the developer game data (e.g., a specific territory, character, event, weapon, etc.). Further, traditional gaming systems may allow developer computing devices to push updates to the gaming systems periodically. Traditional gaming systems may be limited to updating the database at particular times (e.g., periodically throughout the day). This can introduce a delay in the implementation and/or execution of a game update. Further, as some updates may be time-sensitive, therefore, it may be disadvantageous to push each update to the gaming system at the same time. Additionally, it may be disadvantageous to push updates to the gaming system to each player. The use of broad, uniform updates to the gaming system may prevent the gaming system from providing a particular subset of the players with testing or premium rights. Further, traditional gaming systems may determine how a character within the game acts based on predetermined attributes associated with the character (e.g., loyalty, fear, happiness, anger, etc.). The actions of a particular character may further be based on the attributes associated with the character. However, these attributes may not affect the dynamics, traits, or abilities associated with a different character. Further, the player may be limited to interacting with the computing device in certain conscribed manners. For example, the player may be limited to selecting a particular character and prescribing an associated action. The use of such a traditional gaming system can increase memory demands and processing usage by the computing devices.

The disclosed gaming system addresses these challenges, among others, by (1) enabling customizable nested object packages; (2) monitoring service calls by a computing device on third party platforms and implementing corresponding modifications to a database; (3) scheduling updates to the database based on the priority of service calls received by developer computing devices; (4) determining inter squad dynamics based on individual character traits; (5) providing modified developer game data to a first set of players and unmodified developer game data to a second set of players; (6) generating character actions for a group of characters based on user swipes; (7) implementing a player proxy for a player; and (8) implementing search nodes and agents to map territories.

For purposes of this disclosure, the term "player," "user," and "customer" may each refer to a person that is operating a computing device in order to control the operation of a game application. For purpose of this disclosure, the term "character" can refer to a virtual avatar or character that a user can control within a game application. The character can be a person, vehicle, object, and/or any entity that the user can control within the game application.

2.0 System Overview

FIG. 1 depicts a schematic diagram of a system 100 including a game server 110 according to some embodiments herein. In the illustrated embodiment, the system 100 includes one or more developer computing devices 102, one or more user computing devices 104, a network 106, webtools 108, a monitoring service 110, a game server 112, an interface 114, an interface handler 116, a database 118, and additional gaming services 120. Any one or any combination of the components shown and described in FIG. 1 can each be implemented using one or more computing devices, such as, but not limited to one or more servers, processors, computing devices, virtual machines, etc., and communicate via the network 106 to implement a game. The network 106 can be a local area network (LAN) or wide area network (WAN), such as the Internet.

The interface 114, the interface handler 116, the database 118, and the additional gaming services 120 may correspond to a backend of the system 100. The webtools 108, the monitoring service 110, and the game server 112 may correspond to a frontend of the system 100. Each of the webtools 108, the monitoring service 110, and the game server 112 may be authorized to make particular modifications to the developer game data and/or the player game data stored in the database 118. For example, the developer computing devices 102 may utilize the webtools 108 to implement design modifications to the database 118. Further, the user computing devices 104 may utilize the monitoring service 110 in order to implement out of game modifications to the database 118 via a third party service or platform. Further, the user computing devices 104 may utilize the game server 112 to communicate with the backend of the system 100 in order to implement the game and make in game modifications. Each of the webtools 108, the monitoring service 110, and the game server 112 can communicate with the interface 114 in order to modify the developer game data and/or the player game data within the database 118. Therefore, players and developers via the developer computing devices 102 and the user computing devices 104 can modify the backend of the system 100 via the webtools 108, the monitoring service 110, and the game server 112.

2.1 Computing Devices

The developer computing devices 102 and/or the user computing devices 104 may include computing devices that can include any network-equipped computing device, for example desktop computers, laptops, smartphones, tablets, e-readers, gaming consoles, wearable technology, and the like.

2.2 Network

As illustrated in FIG. 1, the developer computing devices 102, the user computing devices 104, the webtools 108, the monitoring service 110, and the game server 112 communicate over the network 106. The network 106 can include any appropriate network, including an intranet, the Internet, a cellular network, a local area network or any other such network or combination thereof. In the illustrated embodiment, the network 106 is the Internet. Protocols and components for communicating via the Internet or any of the other aforementioned types of communication networks are known to those skilled in the art of computer communications and thus, need not be described in more detail herein.

2.3 Interface

The webtools 108, the monitoring service 110, and the game server 112 can communicate with an interface 114 that is in communication with an interface handler 116. The interface 114 can be an application programming interface ("API"). For example, the interface 114 can be a Representational State Transfer ("REST") API. It will be understood that the interface 114 can be any type of interface that allows one or more computing devices to communicate with and/or modify the database 118. The interface 114 may allow one or more computing devices to access particular game data (e.g., player game data and/or developer game data) and/or functionality associated with the gaming environment and stored in the database 118. The interface 114 may provide a uniform resource identifier ("URI") (e.g., a uniform resource locator ("URL")) that enable computing devices to access a specific location within the database 118. The interface 114 may be implemented in or by the interface handler 116. Further, the interface handler 116 (e.g., an API handler) can utilize the interface 114 and based on input received to the interface 114, enable access to the database 118. Therefore, the interface 114 may receive input from computing devices and the interface handler 116 may receive the input and determine how to modify the database 118.

2.4 Database

The database 118 may be a collection of data (e.g., player game data, game state data, and/or developer game data associated with the game). For example, the database 118 can store developer game data and/or player game data corresponding to characters, actions, territories, events, etc. A game server 112 may communicate with the database 118 periodically to determine how to execute the game. Further, via the interface 114 and the interface handler 116, one or more computing devices can modify the developer game data and/or the player game data stored in the database 118 and based on the modified developer game data and/or player game data, the game server 112 may adjust how the game is run.

The database 118 can store game data (e.g., developer game data and player game data) including game rules, poses/paths, environmental settings, environmental objects, constraints, skeleton models, route information, and/or other game application information. At least a portion of the game data can be stored in the database 118. In some embodiments, a portion of the game data may be received and/or stored remotely. Further, at least a portion of the game data may be received during runtime of the game application.

The database 118 can further game state data including a game state, character states, environment states, scene object storage, route information, and/or other information associated with a runtime state of the game application. For example, the game state data can identify the state of the game application at a specific point in time, such as a character position, character operation, character action, game level attributes, and other information contributing to a state of the game application. The game state data can include dynamic state data that continually changes, such as character movement positions, and/or static state data, such as the identification of a game level within the game.

2.5 Webtools

In order to adjust particular developer game data stored in the database 118, the developer computing devices 102 can communicate with webtools 108 via the network 106. The webtools 108 can interact with the backend of the gaming environment in order to make the particular adjustments. In some embodiments, the webtools 108 may correspond to a frontend of the gaming environment that enables the developer computing devices 102 to make modifications to the developer game data. The webtools 108 may be an interface or bundle of tools that enables a developer computing device 102 to generate particular modifications for the developer game data. For example, the webtools 108 may correspond to group of configurable tools, toggles, inputs, or other variables that the developer computing devices 102 can interact with to implement modifications to the developer game data. The webtools 108 may receive the input and generate modifications for the developer game data stored in the database 118. Using the webtools 108, the developer computing devices 102 can modify the game data.

2.6 Monitoring Service

In order to adjust particular player game data stored in the database 118, the user computing devices 104 can communicate with a monitoring service 110 via the network 106 that may be in communication with the interface 114. The monitoring service 110 may be a running service (e.g., a bot or an extension service) that monitors for specific calls. The monitoring service 110 may have a limited set of calls that may be made to the interface 114. For example, the monitoring service 110 may be limited to a particular subset of calls (e.g., a request to implement an event, start a match, modify a character, create a deal, open a beta play test, create new modes, create new types, modify character attributes (e.g., speed, courage, damage, etc.) or adjust particular settings) that can be made to the interface 114. In order to determine what calls should be made to the interface 114, the monitoring service 110 can monitor a third party service or platform. For example, the monitoring service 110 can monitor a social media platform, a forum, a thread, a chat, a post or series of posts, a stream, etc. that may be associated with players of the games. The monitoring service 110 can monitor the third party service or platform for particular calls. The monitoring service 110 may monitor for particular accepted calls (e.g., let's play a game, let me play, please start an event, etc.). The monitoring service 110 may monitor for exact phrases or for phrases that share certain commonalities (e.g., terms, words, meanings etc.). In some embodiments, upon determining that a recognized call has been received, the monitoring service 110 may initiate a vote on the call. For example, the monitoring service 110 may initiate a voting process and, if enough players vote to make the call (e.g., four players), the monitoring service 110 may initiate the call. In other embodiments, the monitoring service 110 may not initiate a vote and may communicate with the interface 114 based on receiving a monitoring service call. Therefore, players via the user computing devices 104 can modify the gameplay via third party platforms and create content and/or modify game play.

2.7 Game Server

The game server 112 may implement a game for the user computing devices 104. In order to implement the game, the game server 112 may periodically obtain data (e.g. game state data, player game data, and/or developer game data) from the database 118. The game server 112 may provide the game to the user computing devices 104 through a network 106 (e.g., a LAN or WAN). Based on the obtained developer game data, the game implemented for the user computing devices 104 may be modified. The game server 112 may obtain modified developer game data from the database 118 upon execution of the game using the game state data. By obtaining modified developer game data at initiation of the game session, the game server 112 can prevent modified developer game data from disrupting an in progress game. In order to determine how developer game data modifications are pushed to the game server 112 and implemented for the user computing devices 104, the developer computing devices 102 can designate particular modifications as critical or non-critical. For example, the developer computing devices 102 may designate the modification as non-critical if the game server 112 can wait to update the developer game data or critical if the modifications require an immediate restart. In some embodiments, the webtools 108 or another component of the gaming environment may analyze the modification to determine the nature of the modification (e.g., whether it is a critical or a non-critical modification).

In the event that a modification is critical, live user computing devices 104 may be notified of critical changes requiring an immediate restart via an immediate notification (e.g., a push notification or WebSocket connection). In the event that a modification is non-critical, the game server 112 may wait to retrieve the updated developer game data until the game has been relaunched or refreshed. The use of critical and non-critical designations for modifications can enable the game server 112 to implement modifications at different time. Further, it allows for developer computing devices 102 to make non-critical modifications to the developer game data without disrupting gameplay.

3.0 Nested Object Packages

The game application can use nested object packages to provide and manage in game content for players. The in game content can be provided as object packages that contain items, additional object packages, and/or nested object packages. More specifically, as disclosed herein, managing access to in game content with multiple levels of customization can enable players to receive customizable content. Each object package may include one or more items. For example, a weapon object package may include a stock, a color, a camouflage, etc. Further, object packages may also include additional object packages. Further, object packages may include nested object packages that also include one or more items. For example, a weapon object package may include a color, a stock, and a scope nested object package. While the items may correspond to particular items that may be included within the object package, the nested object package may include a plurality of items, object packages, and/or nested object packages (e.g., objects) that may be included within the original object package that correspond to a second level of the original object package. The original object package may include any number of levels of objects. Accordingly, customizable in game content can be provided to players.

Figure 2:
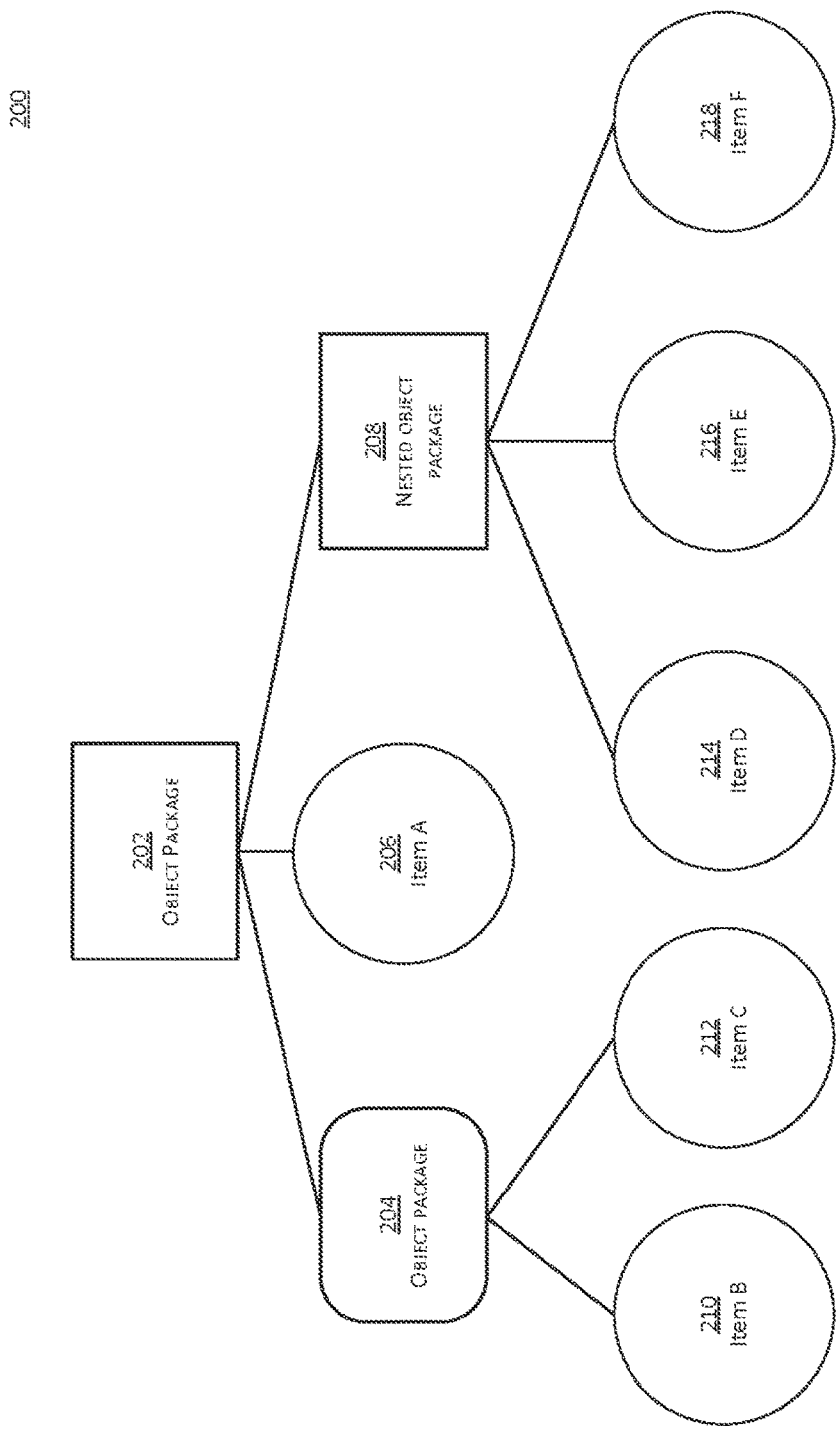
FIG. 2 illustrates an example diagram of an object package according to some embodiments herein.

FIG. 2 illustrates an example diagram 200 of an object package 202 according to some embodiments herein. An object package may be a package of dynamically generated content. In some embodiments, the object package may correspond to a tree of content with multiple branches (e.g., levels) of customizable content. An object package may correspond to any object within the game that includes one or more customizable features. Further, each object package may correspond to one or more of a weapon, a gacha box, a loot crate, a character, an item, a territory, a storyline, gear, resources, blueprints, or any other customizable object within the game. For example, an object package may correspond to a car with a customizable color, grill, tailpipe, hood, rims, etc. Therefore, the object package may correspond to an in game object with various customizable features.

The object package may include one or more items, one or more object packages, and/or one or more nested object packages. Each item may be a specific feature, attachment, customization, etc. For example, where the object package is a loot crate object package, the item may be a specific weapon, a specific amount of currency, specific clothing, etc. Each object package may include a separate object package within the original object package. Upon opening the object package, the player may receive another object package to open. For example, where the object package is a territory object package, the territory object package may contain a lake object package. The territory object package and the lake object package may be different object packages that are opened via different opening experiences (e.g., opening the territory object package may result in a territory and a lake object package). Each object package may further include nested object packages within the original object package. The nested object packages may be wrapped packages that contain items, additional object packages, and/or additional nested object packages. The nested object packages may not be presented to users and may be opened as a part of opening an object package. Upon opening the object package, the nested object package may be opened in generating the results of the original object package. For example, where the object package is a weapon object package, the nested object package may be a stock nested object package that is opened simultaneously with the weapon object package in order to construct the results of the object package (e.g., a shotgun with a stock). Items, object packages, and nested object packages may be collectively referred to as objects. The object package can include any number of objects.

In order to interact with and open the object package, a player may receive the object package as part of the gameplay. In some embodiments, a player may access the object package via the computing devices by interacting with the game. For example, the player can, via a user computing device, instruct a character to open a loot crate that corresponds to an object package. Further, the player may purchase an object that corresponds to an object package. In some embodiments, a gaming system may provide the object package (e.g., make the object package accessible) for a particular user. For example, the gaming system may provide rewards and/or incentives that correspond to object packages to players via the computing devices. Further, a gaming system may link a particular reward associated with an object package to a particular player. Therefore, the play may receive the object package and open the object package.

Each object package may include N possible objects where N may be any number. Each object package may be designated to offer M object for each opening experience where M is less than or equal to N. In order to provide the M objects, the gaming system may further randomly select M of the N possible objects. For example, an object package may contain 5 possible objects and 2 objects may be randomly selected every time the object package is opened. In some embodiments, an object package may correspond to any number of selections. For example, the number of selections may indicate a number of dice rolls. Further, each selection can select one or more objects. Each object may correspond to a stack range indicating a stack range. If the object is selected to be included in an object package, the amount of the selected object may be a random number within the stack range. For example, if a currency item has a stack range of 400 to 600 coins, a random number between 400 and 600 coins may be selected when the currency item is selected for inclusion in an object package (e.g., 501 coins may be included). In some embodiments, an object may have a stack range of 1 to 1 (indicating that one object will be included if the object is selected). Further, each object may include a particular weight. For example, a first object may have a first weight and second object may have a second weight. In some embodiments, in order to determine the likelihood that a particular object is selected, the weight of each object may be divided by the total weight of a level of the object package. For example, if a level includes a first object with weight 4 and a second object with weight 6, the first object may correspond to a 40% probability (e.g., 4/(6+4)) and the second object may correspond to a 60% probability (e.g., 6/(6+4)). Each object may further be designated as replaceable or irreplaceable. If a replaceable object is selected for an object package in a first selection, the object may also be selected in a second selection. If an irreplaceable object is selected for an object package in a first selection, the object may not be selected in the second selection. For example, if an object package contains four equally weighted irreplaceable objects with three objects being randomly selected, the probability of a first object being selected in a first draw may be 25%. If a third object is selected in the first draw, as the third object is irreplaceable, the probability of the first object being selected in the second draw may be 33% as 3 equally weighted objects are available for selection. If a fourth object is selected in the second draw, as the fourth object is irreplaceable, the probability of the first object being selected in the third draw may be 50% as 2 equally weighted objects are available for selection.

In order to determine the customizable features associated with the object package, each object may be associated with a probability or likelihood. The probability may indicate the likelihood that a given object is included within a particular object package. The object package may define the probabilities associated with each object. For example, a weapons object package may define a 50% probability of obtaining a stock nested object package within the weapons object package. In some embodiments, a level of an object package may be exclusive (e.g., the objects may have dependent weights) and a player may be limited to receiving one object from a particular selection of a level of the object package. For example, the probabilities of each of the items, object packages, and nested object packages may sum to 100%. Further, the gaming system may determine based on selecting a particular object from a particular level of the object package, that another object may not be selected. For example, for a particular selection, a first object may have a 60% probability of being chosen, a second object may have a 30% probability of being chosen, and a third object may have a 10% probability of being chosen. Further, for each selection, one random number may be chosen for the group of objects. For example, a number between 1 and 100 may be chosen and if the number is between 1 and 60, the first object may be chosen, between 61 and 90, the second object may be chosen, and between 91 and 100, the third object may be chosen. Therefore, one random number may be chosen for each selection of the level. It will be understood that any number of selections may be conducted.

In other embodiments, a level of an object package may be non-exclusive (e.g., the objects may have independent weights) and a player may receive multiple objects from a particular selection of a level of the object package. For example, one or more first probabilities may indicate a likelihood of a particular subset of the objects of a level (e.g., a first object and a second object, a first object and a third object, a second object and a third object, or a first object, a second object, and a third object), one or more second probabilities may indicate a likelihood of a particular object of the level (e.g., a first object, a second object, or a third object), and a third probability may indicate a likelihood of no objects of the level. For example, the first object, the second object, and the third object may have a 10% probability of being chosen together, the first object and the third object may have a 15% probability of being chosen together, the first object and the second object may have a 15% probability of being chosen together, the second object and the third object may have a 15% probability of being chosen together, the first object may have a 25% probability of being chosen, the second object may have a 25% probability of being chosen, the third object may have a 25% probability of being chosen, and there may be a 60% probability of no objects being chosen.

Further, a particular level of the object package may include an item and a nested object package. The item may have a 60% probability of being chosen and the nested object package may have a 30% probability of being chosen. Further, a random number may be chosen for each object. For example, for a first selection, a first number between 1 and 100 may be chosen and if the first number is between 1 and 60, the item may be chosen and a second number between 1 and 100 may be chosen and if the second number is between 1 and 30, the nested object package may be chosen. In another example, a particular level of the object package may include a group of objects (e.g., a first item and a second item). The first item may have a 60% probability of being chosen and the second item may have a 35% probability of being chose. Further, for a first selection, one random number may be chosen for the group of objects. For example, for a first selection, a number between 1 and 100 may be chosen and if the number is between 1 and 35, the first item and the second item may be chosen, between 36 and 60, the first item may be chosen, and between 61 and 100, no items may be chosen. For subsequent selections, another random number may be chosen. Therefore, one or more of the first item and the second item may be chosen based on the number of selections. Therefore, multiple random numbers may be chosen for each level and the given level can include none of, a portion of, or all of the objects within a particular level. Therefore, based on the probabilities associated with each object, the gaming system can determine the contents of an object package.

One example of an object package may be a "New Year's Special" object package that contains a first level with a "500 coins" item with 100% probability, a "Fancy Boots" item with 50% probability, and a "Random Stuff" nested object package with 100% probability. The "New Year's Special" object package may contain a second level corresponding to a first level of a "Random Stuff" nested object package that may include a "New Socks" item with 100% probability, an "Epic Eyewear" item with 10% probability, a "Legendary Shotgun" item with 0.01% probability, a "Worn Baseball Cap" item with 100% probability, and a "Stylish Pants" item with 20% probability. The first level and/or the second level may be an exclusive level or a non-exclusive level. Upon opening the object package, the player may see any combination of "500 coins," "Fancy Boots," "New Socks," "Epic Eyewear," "Legendary Shotgun," "Worn Baseball Cap," and/or "Stylish Pants." In some embodiments, the "Random Stuff" nested object package may not be nested and the player may see any combination of "500 coins," "Fancy Boots," and/or the "Random Stuff" object package.

Another example of an object package may be a "Territory" object package that contains a first level with a "Nomad Outpost" item with 30% probability, a "Water" nested object package with 100% probability, and a "Size" nested object package with 100% probability. The "Territory" object may contain a second level corresponding to a first level of the "Water" nested object package and a first level of the "Size" nested object package. The "Water" nested object package may include a "Lake" item with 10% probability, a "River" item with 20% probability, and a "Shallow Aquifer" with 100% probability and the "Size" nested object package may include a "Large" item with 33% probability, a "Medium" item with 33% probability, and a "Small" item with 33% probability. The "Water" nested object package may determine water features associated with the territory (e.g., whether the territory includes a lake) and the "Size" nested object package may determine the size of the territory (e.g., small, medium, or large).

In the example of FIG. 2, the object package 202 may be an object package that is provided as in game content to a player. For example, the object package 202 may correspond to a loot crate that is purchasable by a player and the object package 202 may be used to determine the contents of the loot crate that are provided to the player as part of the opening experience. The object package 202 can include an object package 204, an item A 206, and a nested object package 208. It will be understood that the object package 202 can include more, fewer, or different objects. For example, the object package 202 may include multiple objects. Further, the object package 202 may be an exclusive object package or a non-exclusive object package.

The object package 204 may be an unwrapped object that is provided as in game content to a player. The object package 204 may further correspond to a probability that it is included in the object package 202. In the event that the object package 204 is included in the object package 202, as the object package 204 is not nested, the object package 204 may be provided to the player based on opening the object package 202. The player can subsequently open the object package 204 during a subsequent opening experience. The object package 204 may include Item B 210 and Item C 212 that may be provided as part of the subsequent opening experience. Therefore, the object package 202 can include an additional object package 204 that may be opened via a separate opening experience.

The item 206 may be an item included within the object package 202. For example, where the object package 202 corresponds to a character, the item 206 may be a pair of slacks. Based on the probability associated with the item 206, the item 206 may subsequently be provided to a player who opens the object package 202.

The nested object package 208 may be a wrapped object that is not provided as in game content to a player. The nested object package 208 may further correspond to a probability that it is included in the object package 202. In the event that the nested object package 208 is included in the object package 202, as the nested object package 208 is nested, the contents of the nested object package 208 may be provided to the player based on opening the object package 202. The nested object package 208 and consequently the object package 202 may include Item D 114, item E 216, and Item F 218 that may be provided as part of opening the object package 202. Each item may be associated with a corresponding probability. The object package 202 can include a nested object package 208 that may be provided as part of the opening experience for object package 202.

Figure 3:
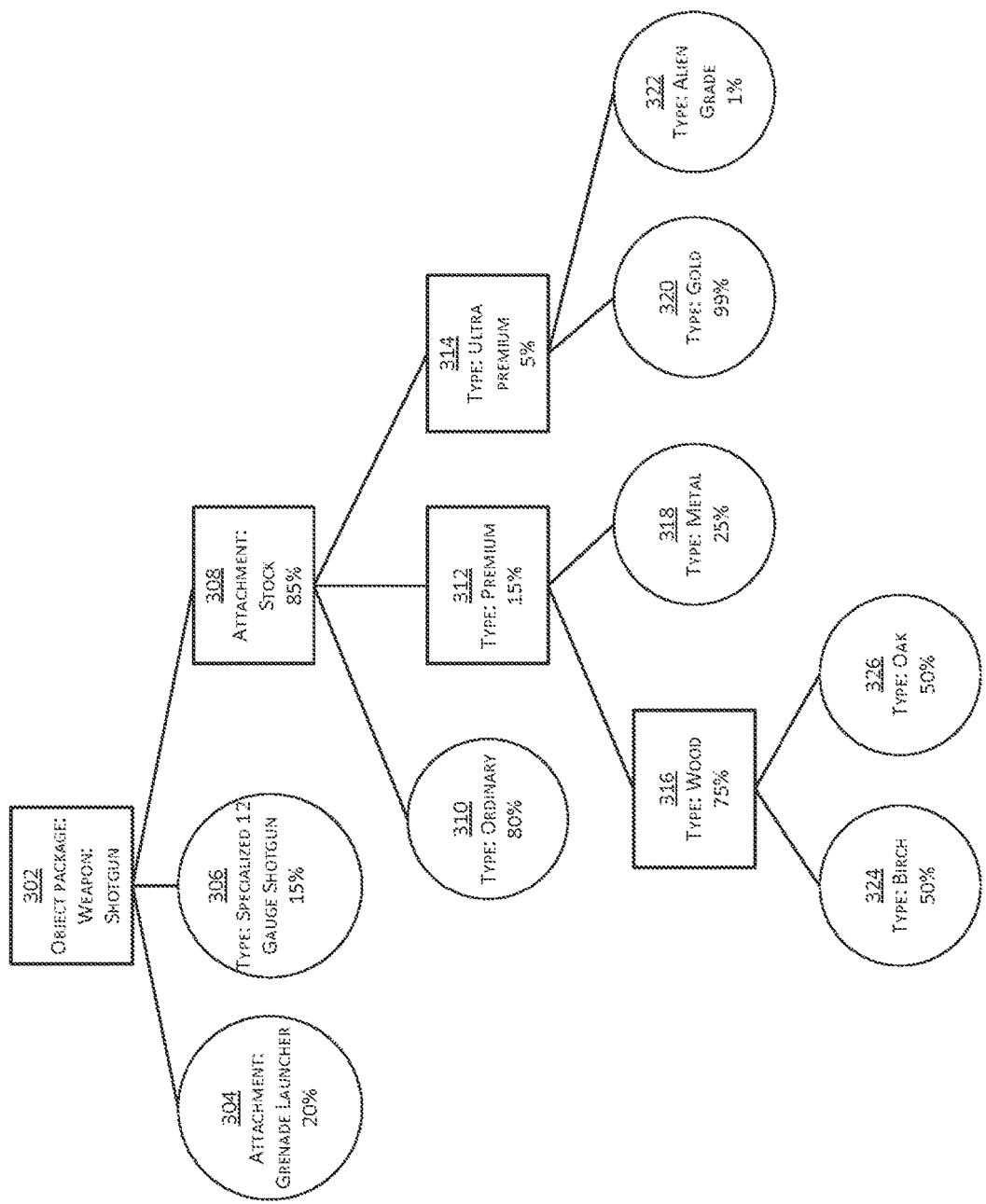
FIG. 3 illustrates an example diagram of an object package according to some embodiments herein.

FIG. 3 illustrates an example diagram 300 of an object package 302 according to some embodiments herein. The object package 302 may be a weapon object package. Further, the object package 302 may be a shotgun object package. The object package 302 may include any number of objects that define and/or customize the object package 302. It will be further understood that the object package 302 can include any number of levels of objects.

In the example of FIG. 3, the object package 302 may include a first level that includes an item 304, an item 306, and a nested object package 308. The item 304 may be an attachment for the shotgun. Specifically, the item 304 may be a grenade launcher with a 20% likelihood of being included in the object package 302. The item 306 may be a type of shotgun. Specifically, the item 306 may be specialized 12 gauge shotgun with a 15% likelihood of being included in the object package 302. The nested object package 308 may be an attachment for the shotgun. Specifically, the nested object package 308 may be a stock with an 85% likelihood of being included in the object package 302. The nested object package 308 may include a first level that includes an item 310, a nested object package 312, and a nested object package 314. The first level of the nested object package 308 may correspond to a second level of the object package 302. The item 310 may be a type of stock. Specifically, the item 310 may be an ordinary stock with an 80% likelihood of being included in the nested object package 308. Further, the item 310 may have a 68% likelihood of being included in the object package 302 which may be found by multiplying the probability of the nested object package 308 and the probability of the item 310 (e.g., 80%×85%=68%). The nested object package 312 may be a type of stock. Specifically, the nested object package 312 may be a premium stock with a 15% likelihood of being included in the nested object package 308. The nested object package 314 may be a type of stock. Specifically, the nested object package 314 may be an ultra premium stock with a 5% likelihood of being included in the nested object package 308.

The nested object package 312 may include a first level that includes a nested object package 316 and an item 318 and the nested object package 314 may include a first level that includes an item 320 and an item 322. The first level of each of the nested object package 312 and the nested object package 314 may correspond to a second level of the nested object package 308 and a third level of the object package 302. The nested object package 316 may be a type of premium stock. Specifically, the nested object package 316 may be a wood stock with a 75% likelihood of being included in the nested object package 312. The item 318 may be a type of premium stock. Specifically, the item 318 may be a metal stock with a 25% likelihood of being included in the nested object package 312. The item 320 may be a type of ultra premium stock. Specifically, the item 320 may be a gold stock with a 99% likelihood of being included in the nested object package 314. The item 322 may be a type of ultra premium stock. Specifically, the item 322 may be an alien grade stock with a 1% likelihood of being included in the nested object package 314.

The nested object package 316 may include a first level that includes an item 324 and an item 326. The first level of the nested object package 316 may correspond to a second level of the nested object package 312 and a third level of the nested object package 308 and a fourth level of the object package 302. The item 324 may be a type of premium wood stock. Specifically, the item 324 may be a birch stock with a 50% likelihood of being included in the nested object package 316. The item 326 may be a type of premium wood stock. Specifically, the item 326 may be an oak stock with a 50% likelihood of being included in the nested object package 316. Further, the item 326 may have a 4.8% likelihood of being included in the object package 302 which may be found by multiplying the probability of the nested object package 308, the probability of the nested object package 312, the probability of the nested object package 316, and the probability of the item 326 (e.g., 85%×15%×75%×50%=4.8%).

4.0 User Monitoring Service

A user monitoring service can monitor calls made by users on third party services and/or platforms. Players often communicate on third party platforms to discuss the game and/or other common interests. For example, the players may communicate using a social media platform that can include groups and/or threads that allow players to discuss the game. While discussing the game, the players may determine that they would like to modify the game (e.g., initiate a multi-player event). Based on this determination, the players via computing devices can generate monitoring service calls (e.g., "Please start an event"). The gaming system may include a monitoring service that observes these monitoring calls and communicates with an interface to make corresponding changes to the game database. The monitoring service may be limited in the changes that can be made to the game database. For example, the monitoring service may be limited to initiating new in game events and generating new characters. Further, the monitoring service may be configured to monitor the third party services for specific monitoring calls. Accordingly, the gaming system can monitor, via the monitoring service, player requests and implement these requests.

Figure 4:
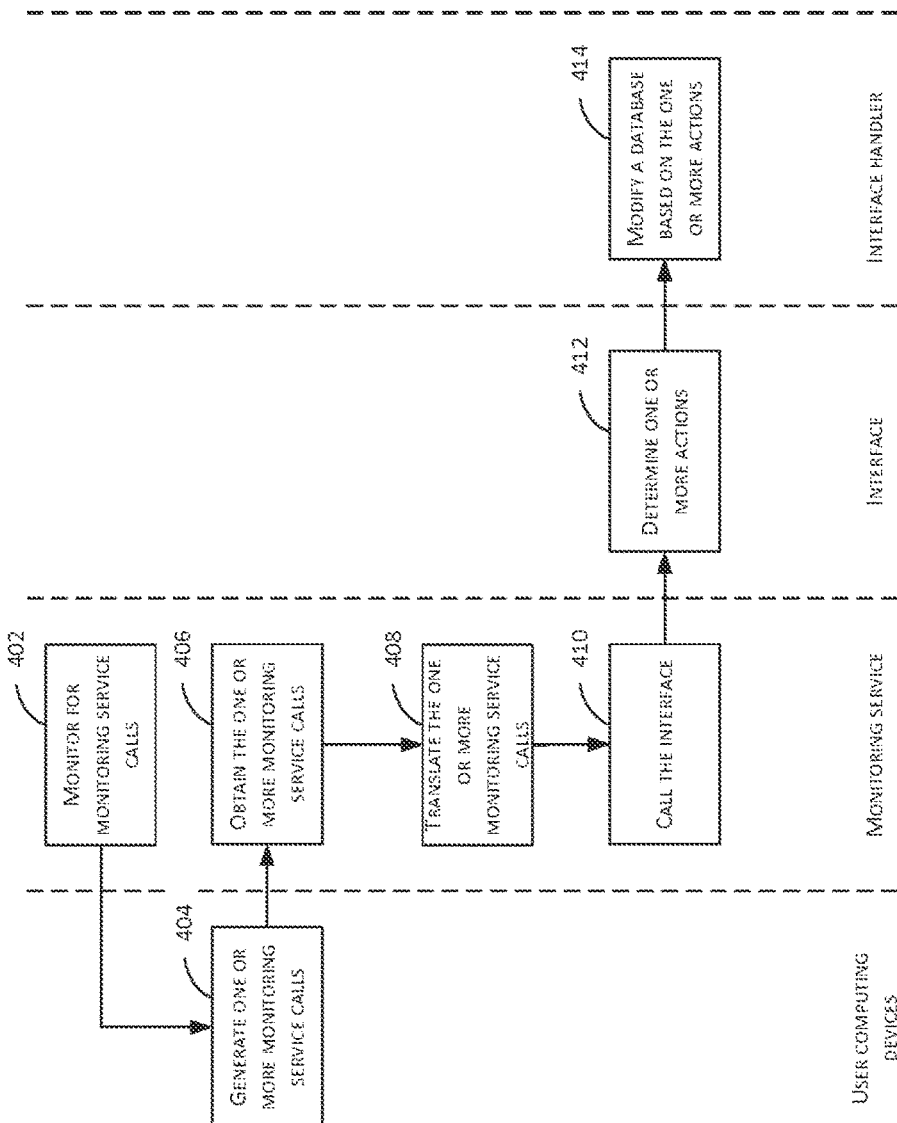
FIG. 4 illustrates an example flowchart of a method for receiving user monitoring service calls and modifying a database according to some embodiments herein.

FIG. 4 illustrates an example flowchart of a method 400 for receiving user monitoring service calls and modifying a database according to some embodiments herein. In some embodiments, a monitoring service can monitor for monitoring service calls at 402. The monitoring may involve monitoring a third party service or platform for particular calls. In some embodiments, the monitoring service can monitor platforms or services outside of the gaming environment (e.g., a social media platform). The monitoring may involve monitoring the third party service or platform for actions, messages, or other calls. In some embodiments, the user computing devices can generate one or more monitoring service calls at 404. The one or more monitoring service calls may include particular actions by the user computing devices such as posting a post, comment, or thread that includes particular text. Further, the one or more monitoring service calls may be voted on or verified by other players via the user computing devices. For example, a user computing device may verify a previous monitoring service call by voting to make the monitoring service call and/or by making the same monitoring service call (e.g., the first user computing device and the second user computing device may make the same monitoring service call). In some embodiments, the monitoring service can obtain the one or more monitoring service calls at 406. The monitoring service can verify that the one or more monitoring service calls meet certain qualifications. For example, the monitoring service may verify that the monitoring service call is a recognized call, that the monitoring service call satisfies a validating or voting requirement (e.g., a requirement that N user computing devices vote to implement the monitoring service call), that the monitoring service call is a permitted call, or any other validation. In some embodiments, the monitoring service can translate the one or more monitoring service calls at 408. The monitoring service can translate the one or more monitoring service calls into a format understood by the interface. For example, the monitoring service can modify the monitoring service calls into a common format or language for input into the interface. In some embodiments, the monitoring service may not translate the one or more monitoring service calls.

In some embodiments, the monitoring service can call the interface at 410. The monitoring service can call the interface using the one or more translated monitoring service calls as inputs to the interface. In some embodiments, the interface can determine one or more actions at 412. The interface can determine one or more modifications to be made to an associated database storing player game data. For example, the interface can determine how to modify, add, or delete player game data in the database based on the translated one or more monitoring service calls. Further, the interface can initialize an event for one or more players using the one or more translated monitoring service calls (e.g., the interface can initialize a multiplayer event). For example, the interface can modify the game data to define a multiplayer event (e.g., the one or more translated monitoring service calls may define a type of event, a length of the event, players eligible for the event, or any other characteristic of the event). The interface may determine the one or more modifications in order to implement the requested monitoring service calls by the user computing devices. In some embodiments, the interface handler can modify the database based on the one or more actions at 414. The interface can determine the one or more actions and provide the one or more actions to the interface handler. Based on receiving the one or more actions, the interface handler can modify, add, or delete player game data from the database.

Therefore, the user computing devices can generate monitoring service calls for a monitoring service in order to modify player game data stored by the database.

5.0 Live Deployment Process

Modifications to the game can be implemented by modifying the database associated with the game. Aspects of this disclosure relate to a live deployment of modifications to the game database. The gaming system may expose particular tools to content developers via developer computing devices in order to modify the developer game data stored in the database. The developers, using the developer computing devices, may modify the developer game data in real time. As the modifications are made to the game date, the gaming system may determine whether particular modifications are critical or non-critical. Based on the nature of the modifications, the gaming system can schedule how the game server obtains the developer game data. For example, if the modification is a critical update, the gaming system can prompt a restart of the game such that the game server obtains the modified developer game data immediately. If the modification is a non-critical update, the gaming system may not prompt a restart of the game and the game server may obtain the modified developer game data upon the next launch of the game. Accordingly, the gaming system can cause the game server to receive critical updates immediately and non-critical updates at a later time.

Figure 5:
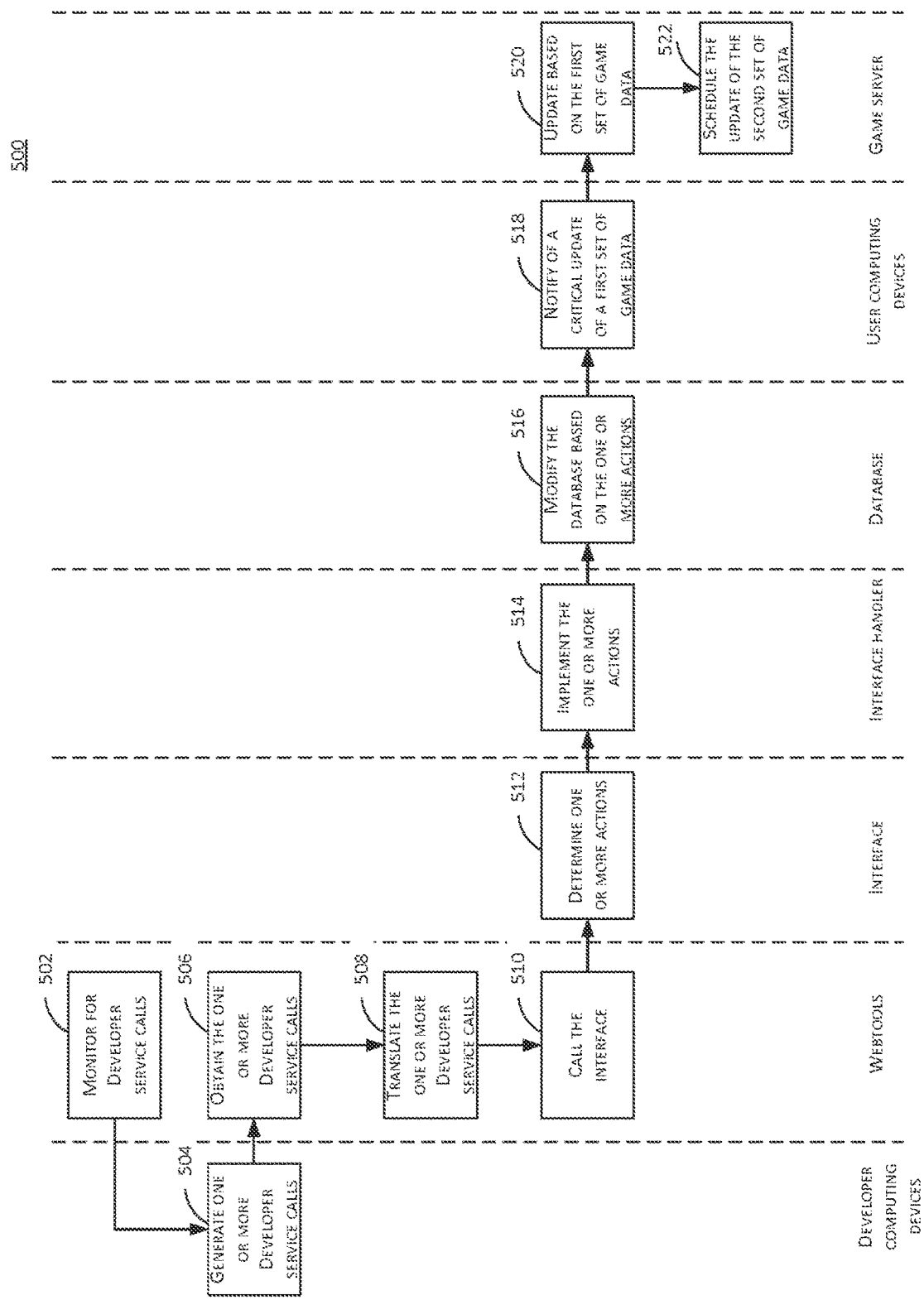
FIG. 5 illustrates an example flowchart of a method for pushing modifications to a database associated with a plurality of players according to some embodiments herein.

FIG. 5 illustrates an example flowchart of a method 500 for pushing modifications to a database associated with a plurality of players according to some embodiments herein. In some embodiments, webtools can monitor for developer service calls at 502. The monitoring may involve monitoring a series of tools and/or an interface provided to developer computing devices in order to make service calls. In some embodiments, the webtools may provide a series of customizable features associated with the game and may monitor how the user customizes the customizable features. In some embodiments, the developer computing devices can generate one or more developer service calls at 504. The one or more developer service calls may include particular requests by the developer computing devices to modify the developer game data that is used to implement the game. For example, the one or more developer service calls may include requests to modify characters, events, territories, game characteristics, or other features of the game. The developer computing devices may generate the one or more developer service calls by interacting with the webtools. In some embodiments, the webtools can obtain the one or more developer service calls at 506. The webtools can verify that the one or more developer service calls meet certain qualifications. For example, the webtools may verify that the developer service call is a recognized call and/or that the developer service call is a permitted call. Further, the webtools may verify that particular developer computing device (and an associated developer) is permitted to make a particular developer service call. In some embodiments, the webtools may not be permitted to make particular modifications and/or certain developer computing devices (and associated developers) may not be permitted to make particular developer service calls. In some embodiments, the webtools can translate the one or more developer service calls at 508. The webtools can translate the one or more developer service calls into a format understood by the interface. For example, the webtools can modify the developer service calls into a common format or language for input into the interface. In some embodiments, the webtools may not translate the one or more developer service calls. Further, the webtools can designate particular developer service calls as critical or non-critical based on the content of the developer service calls.

In some embodiments, the webtools can call the interface at 510. In some embodiments, the interface can determine one or more actions at 512. The interface can determine one or more modifications to be made to an associated database storing developer game data based on the translated developer service calls. In some embodiments, the interface handler can implement the one or more actions at 514. The interface can determine the one or more actions and provide the one or more actions to the interface handler. Based on receiving the one or more actions, the interface handler can implement the actions. In some embodiments, the interface handler can modify the database based on the one or more actions at 516. In some embodiments, the interface handler can notify user computing devices of a critical update of a first set of developer game data (e.g., critical modifications) at 518. The interface handler may inform user computing devices that an immediate restart is required and, subsequently, the game server may be restarted. In some embodiments, the interface handler can update the game server based on the first set of developer game data causing the game server to restart at 520. For example, the first set of developer game data may be associated with a critical restart. Further, the game server may shutdown immediately and disconnect the user computing devices (e.g., cause the user computing devices to be returned to a home screen or lobby). In some embodiments, the game server may not notify user computing devices of the critical update prior to the restart. For example, the game server may restart and subsequently a message informing user computing devices of the critical update may be provided. In some embodiments, the interface handler can schedule non-critical updates of a second set of developer game data (e.g., non-critical modifications) at 522. The non-critical updates may be scheduled to be implemented until the next launch of the game and the game server. For example, the game server may wait until an in-progress game is complete and may prevent new game sessions from spinning up during this period. Once the in-progress games are complete, the game server may restart (e.g., once the game server is fully idle). This allows a game server to make small adjustments while the game is live, without adversely disrupting active players. The game server may receive non-critical updates of game data without taking down the game server for a period of time. In the event, that a critical update of game data is determined, the game server may be restarted. The nature of the update can impact how the game server is updated. The developer computing devices can generate developer service calls for webtools in order to modify how developer game data is updated to a game server.

6.0 Personality Traits

Based on the received developer game data, the game server can implement a game with a particular gameplay for the computing devices. Aspects relate to modifying gameplay based on character personality traits. Each character of the game may have a particular set of character personality traits that define how the character acts. The behavior of a group (e.g., squad) of characters may depend on each character's personality traits. For example, a certain set of character personality traits may comingle or interact better with a first set of character personality traits and comingle or interact worse with a second set of character personality traits. A player may instruct a character to do an action associated with another character (e.g., heal an ally) and the character's response to this instruction may be based on the personality traits of each character. For example, if the personality traits of each character are not compatible, the character may ignore the instruction or provide a low priority level to the instruction. The gaming system can use personality traits to affect how characters respond to instructions. The personality traits may be dynamic. For example, the personality traits for a character may be updated by removing, adding, or modifying personality traits. In some cases, a player, via a user computing device, may request a particular personality traits for a particular character. For example, a player may purchase a personality trait for a particular character (e.g., such that the character always protects another character, always fights, never goes towards a shadow, etc.). Based on the purchase of the personality trait for a character, the system can add the purchased personality trait for the character.

Figure 6:
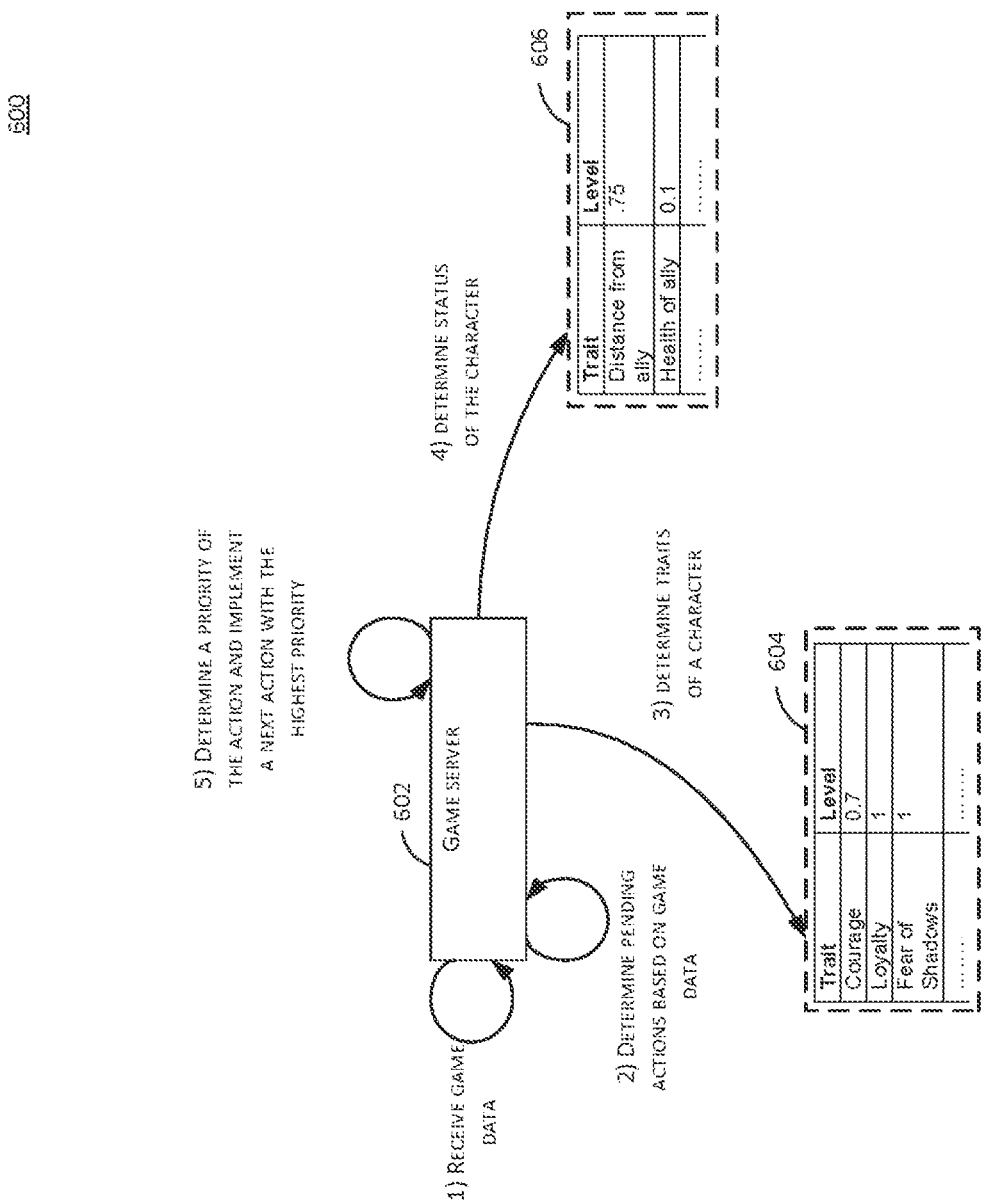
FIG. 6 depicts a schematic diagram of a system including a game server according to some embodiments herein.

FIG. 6 depicts a schematic diagram of a system 600 including a game server 602 according to some embodiments herein. The game server 602 may be in communication with an interface, an interface handler, a database, and/or user computing devices. The game server 602 can determine a priority for a given action based on the observed player game data. The game server 602 can modify the priority of a particular action based on character personality traits associated with a character.

At (1), the game server 602 can determine player game data associated with the game. For example, the player game data may correspond to observed events in the game. Further, the player game data may include data about the characters and actions for each character. The actions for each character may include actions such as heal an ally, fire a weapon, rage fire, retreat, shelter in place, switch teams, or any other action to be performed by the characters.

At (2), the game server 602 can determine pending actions based on the player game data. For example, the game server 602 can determine actions that are requested to be implemented by a player via a user computing device. Further, the game server 602 can determine predetermined actions associated with the character. For example, the game server 602 can determine actions that are associated with the character by the game server 602. The game server 602 may automatically associate particular actions with a character (e.g., fire on an enemy, heal an ally, move in a particular direction). Based on the determined player game data, the game server 602 can identify particular actions for the character. The actions associated with a character may be identified in a list of pending actions for the character. The list of pending actions may be sorted based on the priority of each action. For example, higher priority actions may be listed first and implemented first and lower priority actions may be listed later and implemented later. In some embodiments, the priority of each action may be based on when the action is requested or received. Further, the priority of an action may be based on the traits of a particular character.

At (3), the game server 602 can determine traits 604 of a character. Each character may be associated with a set of personality traits. The personality traits may include one or more of leadership, friends, dislike, courage, fear, loyalty, fear of shadows, or any other personality trait. The leadership trait may cause characters with high leadership traits to take point, make calls, dictate a formation, and/or target better and characters with low leadership traits to make selfish decisions. The friends traits may cause characters with high friendship traits to automatically help a friend, lose a boost when a friend dies, and/or gain a boost when a friend completes a task and characters with low friendship traits to not auto help characters. The dislike trait may cause characters with high dislike traits to not automatically assist characters. The courage trait may cause characters with high courage traits to be resistant to losing morale, to charge into battle, and/or resist retreat and characters with low courage traits to be resistant to entering battle. The fear trait may cause characters with high fear traits to be afraid of the dark, death combat, loud noises, death, or grenades, to panic (e.g., freeze, run away, blind fire, etc.), and/or to run away when reaching a certain health and characters with low fear traits to be reckless. The loyalty trait may measure loyalty between characters and characters with a high loyalty trait may help each other and characters with a low loyalty trait may ignore and/or sabotage each other. Each trait may be associated with a ranking on scale (e.g., a ranking between 0 and 1 with 0 being low and 1 being high). In the example of FIG. 6, the character has a set of traits 604 including a courage with a score of 0.6, a loyalty with a score of 1, and a fear of shadows with a score of 1 each ranked on a scale of 0 to 1.

At (4), the game server 602 can determine status 606 of the character. The status 606 of the character indicates that the distance from an ally is 0.75 on a scale of 0 to 1 (indicating a medium high distance from the ally). The status 606 of the character further indicates that health of an ally is 0.1 on a scale of 0 to 1 (indicating a low health for the ally).

At (5), the game server 602 can determine a priority of an action and implement a next action with the highest priority. As the character has a high loyalty (e.g., a 1 on a scale of 0 to 1), is a medium-high distance from the ally (e.g., a 0.75 on a scale of 0 to 1), and the health of the ally is low (e.g., a 0.1 on a scale of 0 to 1), the action "Heal Ally" may have a high priority. In some embodiments, the scores for each trait and/or status may be combined (added, summed, etc.) to generate the priority of an action. In other embodiments, the score for a trait may correlate to the performance or non-performance of particular actions. For example, if a character has a high fear of shadows (e.g., a score over 0.7 on a scale of 0 to 1), any action including entering an area with shadows may have a low priority and/or may not be performed by the character. Therefore, the action may be moved at or near the top of the list such that the action is implemented sooner. Therefore, the priority of actions can be modified based on the traits of character and/or status of a character.

Figure 7:
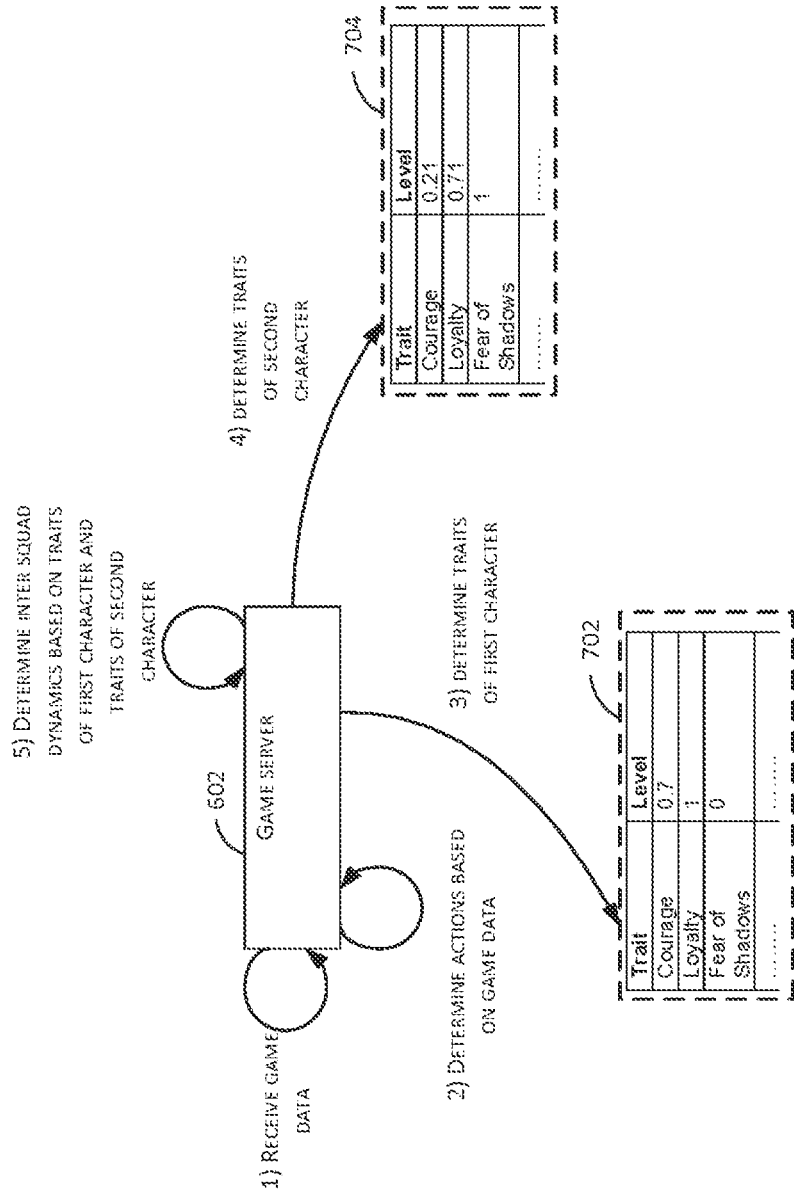
FIG. 7 depicts a schematic diagram of a system including a game server according to some embodiments herein.

FIG. 7 depicts a schematic diagram of a system 700 including a game server 602 according to some embodiments herein. The game server 602 may be in communication with an interface, an interface handler, a database, and/or user computing devices. The game server 602 can determine group dynamics based on the observed player game data. The game server 602 can modify the group dynamics based on the character traits of each character of the group At (1), the game server 602 can determine player game data associated with the game. For example, the player game data may correspond to observed events in the game. Further, the player game data may include data about the characters and actions for each character.

At (2), the game server 602 can determine pending actions based on the player game data for each character. The game server 602 can determine a list of actions for each character. The list of actions can include actions that are requested to be implemented by a player via a user computing device and/or predetermined actions. Each action may be associated with particular priority and the list of actions may be ranked based on the priority of each action.

At (3), the game server 602 can determine traits 702 of a first character of a group of characters. The first character has a set of traits 702 including a courage with a score of 0.7, a loyalty with a score of 1, and a fear of shadows with a score of 0, each ranked on a scale of 0 to 1.

At (4), the game server 602 can determine traits 704 of a second character of the group of characters. The second character has a set of traits 704 including a courage with a score of 0.21, a loyalty with a score of 0.71, and a fear of shadows with a score of 1, each ranked on a scale of 0 to 1.

At (5), the game server 602 can determine inter squad dynamics based on the traits of the first character and the traits of the second character. The combination of character traits for each character of the group may impact how the group performs. For example, if each character of the group has high friend traits, the group may perform better (e.g., characters will automatically help other characters (actions to help other characters will have a high priority). If a character of the group has low friend traits, the group may perform worse (e.g., the character may not assist other characters or may not prioritize assisting other characters). The character with low friend traits may not assist another member of the group unless other actions are performed first (e.g., all other available/pending actions are already performed). For example, with regards to a group of characters with high average friend traits, the group of characters may be more likely to perform an action in a first manner (e.g., during an attack, each character may have a higher priority on assisting other characters and a lower priority on completing the attack) such that the action may take a longer time to be performed, however, the characters may frequently assist other characters. Further, with regards to the same group of characters with low average friend traits, the group of characters may be more likely to perform an action in a second manner (e.g., during an attack, each character may have a lower priority on assisting other characters and a higher priority on completing the attack) such that the action may take a shorter time to be performed, however, the characters may not assist other characters (e.g., characters may be more likely to die). The group of characters may be attempting to achieve a higher level goal (e.g., securing an area) and the individual actions of each character may contribute to this overall goal. The character traits of the characters within a group can be used to modify the group dynamics and alter the performance of a group goal.

7.0 Changesets

Further, aspects of this disclosure relate to providing modified developer game data for a first group of players (e.g., a test group, a beta group, an exclusive group) and unmodified developer game data for a second group of players (e.g., a non-test group, a non-exclusive group) that a. The gaming system may receive a set of modifications (e.g., a changeset) that includes the desired modifications. The gaming system may further receive a designation of the first group of players associated with the set of modifications. When the game server reads developer game data from the database for the first group, the game server will read the developer game data with the set of modifications and when the game server reads developer game data from the database for the second group, the game server will read the developer game data without the set of modifications. The gaming system can provide a changeset for particular user accounts without instantiating a new isolated environment (e.g., a test server and a game server). The first group of user accounts associated with the changeset and the second group of user accounts associated with the unmodified data may have the game implemented in the same live game environment. As the changeset is tested in the live game environment, this provides greater confidence that the changeset will not adversely affect the game environment. Accordingly, the gaming system can create a first group of user accounts (e.g., accounts of players) associated with a first set of developer game data and a second group of user accounts associated with a second set of game data.

Figure 8:
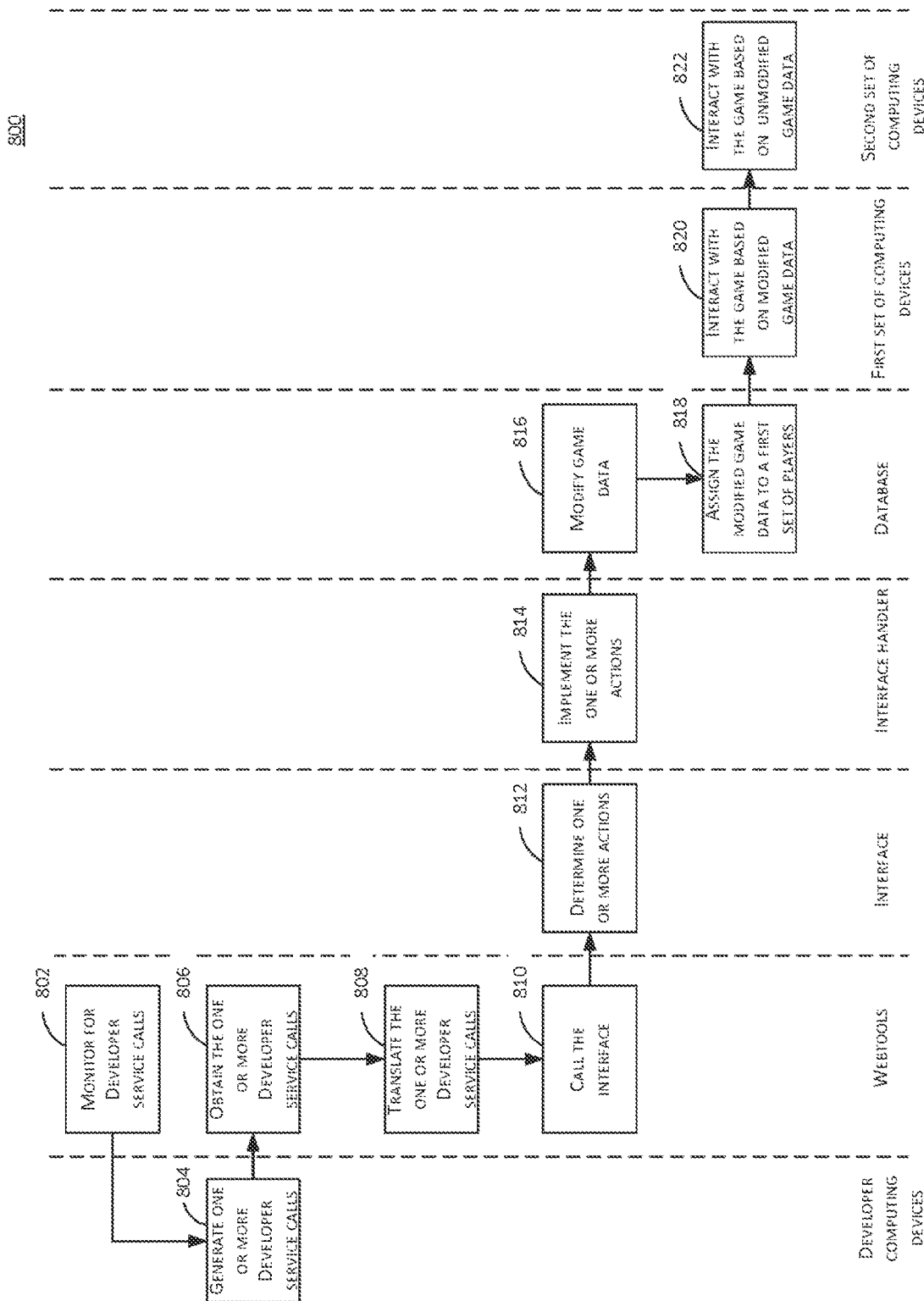
FIG. 8 illustrates an example flowchart of a method for modifying a database for a portion of the computing devices associated with the database according to some embodiments herein.

FIG. 8 illustrates an example flowchart of a method 800 for modifying a database for a portion of the user accounts associated with the database according to some embodiments herein. The game server can designate specific account privileges and groupings associated with user accounts. The developer computing devices can build and implement developer game data in a database for a particular set of test user accounts and/or premium user accounts. In order to implement the modified developer game data, the developer computing devices can generate specific content and migrate the content. The developer game data may be included within a changeset that includes game modifications to implement new developer game data (e.g., premium content). In some embodiments, webtools can monitor for developer service calls at 802. In some embodiments, the developer computing devices can generate one or more developer service calls at 804. The one or more developer service calls may include a modification of a particular feature (e.g., health of a character), setting, or characteristic of the developer game data. For example, the developer service calls can include a modification of a character, an event, in game items, territories, etc. For example, the developer service calls may correspond to an increase in in game character movement speed of 10% increase may be limited to a specific changeset such that characters associated with the changeset move 10% faster. The one or more developer service calls may link the modification to a changeset (e.g., a set of data that includes the developer game data from the database and the modified developer game data). The difference between the changeset and a default set of developer game data from the database may be limited to the portion of the developer game data that is modified. For example, the change set and the default set may both include a first portion of developer game data and the change set may include a second portion of developer game data corresponding to the modified developer game data and the default set may include a third portion of game corresponding to developer unmodified data. In some embodiments, the changeset may include only the developer modified game data. Players via user accounts may be linked by default to a default set of developer game data. The one or more developer service calls may link the modified developer game data to a specific group of user accounts. For example, the one or more developer service calls may associate (e.g., link) the changeset to a specific group of beta user accounts or testing user accounts. In some embodiments, the webtools can obtain the one or more developer service calls at 806. In some embodiments, the webtools can translate the one or more developer service calls at 808. The webtools can translate the one or more developer service calls into a format understood by the interface.

In some embodiments, the webtools can call the interface at 810. In some embodiments, the interface can determine one or more actions at 812. The interface can determine one or more modifications to be made to an associated database storing developer game data based on the translated developer service calls. In some embodiments, the interface handler can implement the one or more actions at 814. Based on receiving the one or more actions, the interface handler can implement the actions. In some embodiments, the interface handler can modify the database based on the one or more actions at 816. The database may maintain a designation of the default set of developer game data and any changesets. The interface handler can modify the database to create a new changeset that includes the modified developer game data. In some embodiments, the interface handler can assign the modified developer game data to a first set of user accounts at 818. The first set of user accounts may be identified by the one or more developer service calls. This may inform the gaming system that the first set of user accounts is associated with the change set. The game server can obtain the changeset of developer game data for the first set of user accounts and the default set of developer game data for a second set of user accounts. In some embodiments, the first set of computing devices associated with the first set of user accounts can interact with the game based on the modified developer game data at 820. In some embodiments, the second set of computing devices associated with the first set of user accounts can interact with the game based on the unmodified developer game data at 822. The first set of computing devices and the second set of computing devices may interact with the game through the game server and the experience for the players may be based on the data assigned to each user account. Both the modified developer game data and the unmodified developer game data may be implemented within the same live game environment. Actions corresponding to the first set of user accounts, as they are associated with the changeset, may be isolated from user accounts outside of the first set of user accounts. Further, in matchmaking for multiplayer games, a multiplayer game may include user accounts from the same set of user accounts (e.g., the first set of user accounts or the second set of user accounts). Subsequently, the changeset can be pushed live to the default set of developer game data such that it is provided to every player. Therefore, the developers can provide changesets that allow developers to make limited changes to developer game data for premium or test user accounts this enables developers to test game modifications in a live environment for adverse effects.

8.0 Swipe to Move

In order to interact with the game being implemented by the computing device, the player can provide certain actions that can be detected by the computing device. Aspects relate to receiving user-generated swipes and translating these user-generated swipes into a desired action for characters. A user generated swipe may be received and translated into an action for the group of characters. The user generated swipe may be translated from screen space to world space and may be implemented as a directional action for the characters. Based on the user generated swipe, pathing data for each character of a group of characters can be generated individually or as a group. Accordingly, the gaming system can determine actions for each character.

Figure 9:
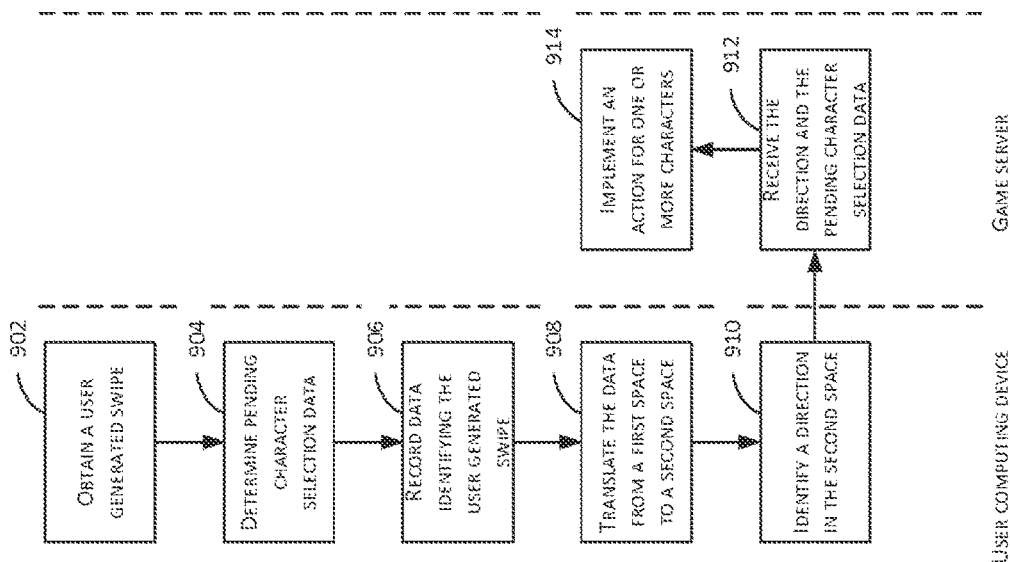
FIG. 9 illustrates an example flowchart of a method for implementing character actions based on user swipes according to some embodiments herein.

FIG. 9 illustrates an example flowchart of a method 900 for implementing character actions based on user swipes according to some embodiments herein. The game characters may be implemented by a gaming system that receives user input and translates the user input into a coordinated movement for characters of a particular group. For example, the characters may move based on received instructions (e.g., input from a joystick, touchpad, microphone, etc.). In some embodiments, the user computing device can obtain a user generated swipe at 902. The user generated swipe may correspond to a swiping motion detected by the user computing device. For example, the user computing device can detect the swiping motion using proximity sensors, location sensors, touch sensors, or any other sensors. A player may interact with the user computing device in order to generate the user generated swipe. For example, the player may generate the user generated swipe by waving a hand over the user computing device, sliding a hand over the user computing device, swiping up on the user computing device (e.g., with a finger or hand), etc. In some embodiments, the user computing device can determine pending character selection data at 904. The player, by interacting with the user computing device, may select multiple characters for a particular action. As will be discussed in greater detail below, the player can group multiple characters into a subgroup. Based on the pending character selection data, the user computing device can identify a pending group of characters for an action.

In some embodiments, the user computing device can record data identifying the user generated swipe at 906. For example, the user computing device can record information indicating characteristics of the user generated swipe (e.g., a direction, intensity, or other characteristic of the user computing device). In some embodiments, the user computing device can translate the data from a first space to a second space at 908. The user computing device can translate the user generated swipe from a screen space to a world space. In some embodiments, the user computing device can identify a direction in the second space at 910. For example, based on translating the data from the first space to the second space, the user computing device can identify the direction within the world space of the user-generated swipe. In some embodiments, the game server can receive the direction and the pending character selection data at 912. For example, the game server can periodically receive the direction and the pending character selection data when a user computing device obtains a user generated swipe. In some embodiments, the game server can implement an action for one or more characters at 914. The action for the one or more characters may be based at least in part on the identified direction and the pending character selection data. Therefore, the game server can implement actions based on user generated swipes.

Figure 10:
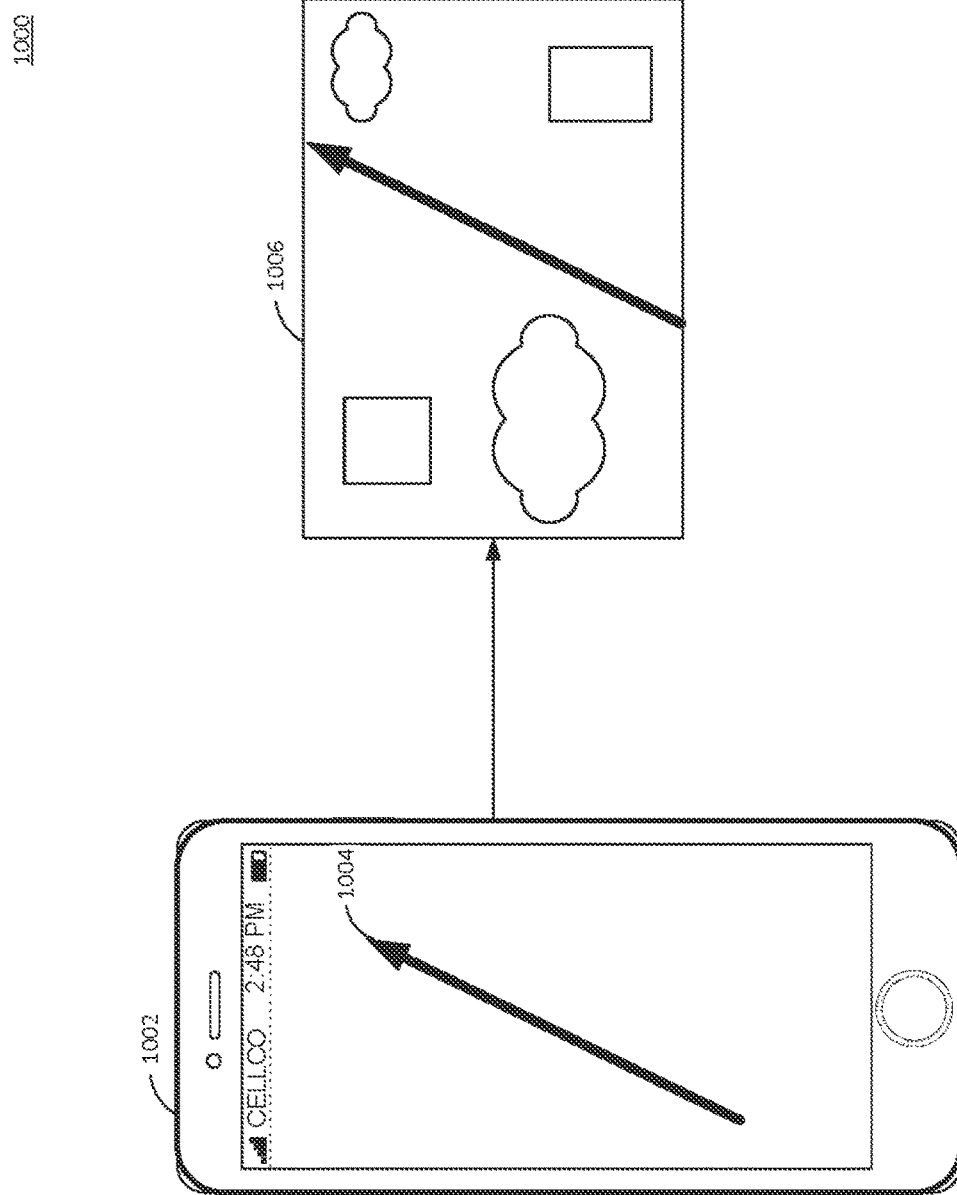
FIG. 10 is a pictorial diagram depicting a swipe in two spaces according to some embodiments herein.

FIG. 10 is a pictorial diagram 1000 depicting a swipe in two spaces according to some embodiments herein. The diagram 1000 may depict how a user generated swipe can be translated from a first space to a second space. Further, the diagram 1000 may illustrate how a user generated swipe is received and translated into a format suitable for implementation for characters. Based on the user generated swipe, pathing data for each character of a group of characters can be generated individually or as a group.

The user computing device 1002 may be a computing device. The user computing device 1002 may include one or more sensors that are configured to receive player input. For example, the player can interact with one or more sensors of the user computing device 1002 (e.g., a touch sensor) in order to generate input for the game being implemented by the user computing device 1002. The player can generate the user generated swipe 1004 by making a swiping motion relative to the user computing device 1002. In some embodiments, the player may physically contact the user computing device in order to generate the user generated swipe. In other embodiments, the player may not make physical contact with the user computing device in order to generate the user generated swipe 1004 (e.g., the player may make the swiping motion within a particular proximity of the user computing device 1002). The user computing device 1002 may detect the user generated swipe 1004 as a movement with respect to the user computing device 1002 that can include a directional component, an intensity component, or any other magnitude or component. The user generated swipe 1004 may be detected relative to a first space (e.g., a screen space). For example, the component information of the user generated swipe 1004 may be relative to the screen space of the user computing device 1002.

Subsequently to detecting the user generated swipe 1004, the user computing device 1002 can translate the user generated swipe 1004 into a second space. For example, the user computing device 1002 can translate the user generated swipe 1004 from the screen space to a world space 1006. The user computing device 1002 can translate the user generated swipe 1004 to project the user generated swipe 1004 into a world space 1006 based on the components of the user generated swipe 1004. The world space may include game features such as other characters, buildings, inaccessible areas, etc. In order to translate the user generate swipe 1004 from the screen space to the world space 1006, the user computing device 1002 can record the start and end of a swipe gesture as a point A and a point B (e.g., screen space coordinates). The user computing device 1002 can unproject the point A and point B into the world space 1006. Further, the user computing device 1002 can generate a ray for each of point A and point B (e.g., using a vector such as a camera forward vector). The user computing device 1002 can utilize ray/plane intersection to identify corresponding points within a level of the game and may generate a vector based on the corresponding points. The vector may identify a movement for one or more characters based on the user generated swipe 1004. By translating the user generated swipe into the world space 1006, the user computing device 1002 can determine how the user generated swipe 1004 is to be implemented in the world space and how pathing data for each character of a group of characters can be generated individually or as a group based on the user generated swipe 1004.

9.0 Grouping Characters

The game can include multiple characters as part of the gameplay. Each character may be associated with individual personality traits and/or missions. In order to control multiple characters at once, the characters can be combined into groups of characters. Icons of characters may be provided via the computing device and the movement of the icons may indicate how the groups are to be formed. For example, if one or more icons are grouped together, the corresponding characters may form a group of characters. Actions received by the computing device may then be applied to each character of the group of characters.

Figure 11:
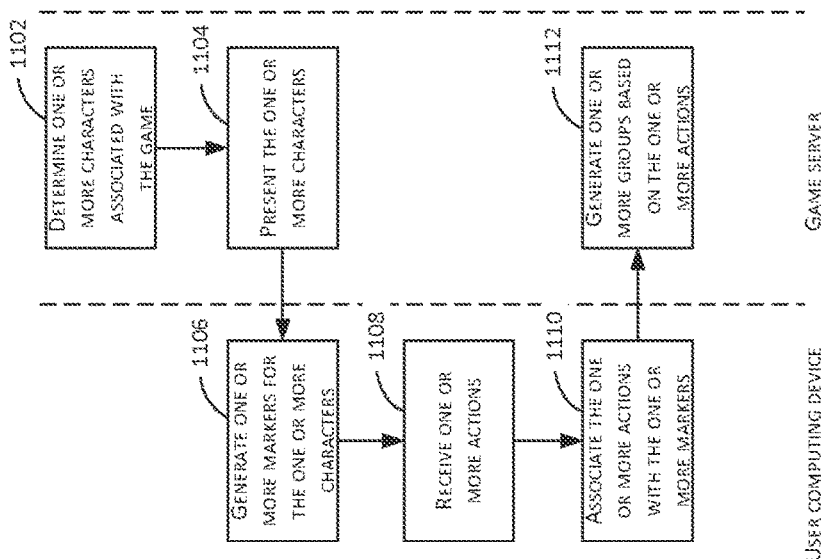
FIG. 11 illustrates an example flowchart of a method for grouping characters based on one or more markers according to some embodiments herein.

FIG. 11 illustrates an example flowchart of a method 1100 for grouping characters based on one or more markers according to some embodiments herein. The player may provide particular actions to be performed by a character of the game by interacting with the user computing device. The player may also provide particular actions to be performed by a group of characters. For example, a player may define a group of characters and define an action to be performed by each character of the group. In some embodiments, the game server can determine one or more characters associated with the game at 1102. The game server can determine available characters for the game. Further, the game server can determine characters that are actively being implemented or utilized. In some embodiments, the game server can determine characters associated with a particular player. For example, a player may be playing the game with characters: "Archer Allie," "Healer Hillary," and "Medic Merl," and the game server may identify these characters. The characters associated with a player may be identified as a squad of characters. In some embodiments, the game server may maintain one or more groupings of the characters. Further, the game server can provide the one or more groupings of characters to the user computing device. In some embodiments, the game server can present the one or more characters to the user computing device at 1104. The game server may send the one or more characters to the user computing device as player game data. In some embodiments, the user computing device can generate one or more markers (e.g., cards, icons, designations, callouts, etc.) for the one or more characters at 1106. Based on the player game data, the user computing device may associate a particular marker with each character available in the game. Based on obtaining the one or more characters, the game server may generate markers for each character. Further, the user computing device can display the one or more markers in order to enable the player to interact with the one or more markers. The one or more markers may be displayed by the user computing device as markers on an interface of the user computing device. In some embodiments, the one or more markers may be displayed based on the one or more groupings (e.g., the one or more markers may be grouped).

In some embodiments, the user computing device can receive one or more actions at 1108. The user computing device can receive the one or more actions as interactions by the player with the one or more markers displayed on the interface of the user computing device. The actions may include moving, grouping, rearranging, or otherwise modifying the one or more markers. In some embodiments, the user computing device can associate the one or more actions with the one or more markers at 1110. The user computing device can determine how the player interacted with the markers (e.g., grouped the markers). The user computing device can provide the one or more actions to the game server. In some embodiments, the game server can generate one or more groups based on the one or more actions at 1112. Based on how the player modified the markers, the game server may generate groups of characters. Further, adjacent or grouped markers may correspond to grouped characters. Therefore, the user computing device can provide markers in order to enable a player to generate groups of characters.

Figure 12:
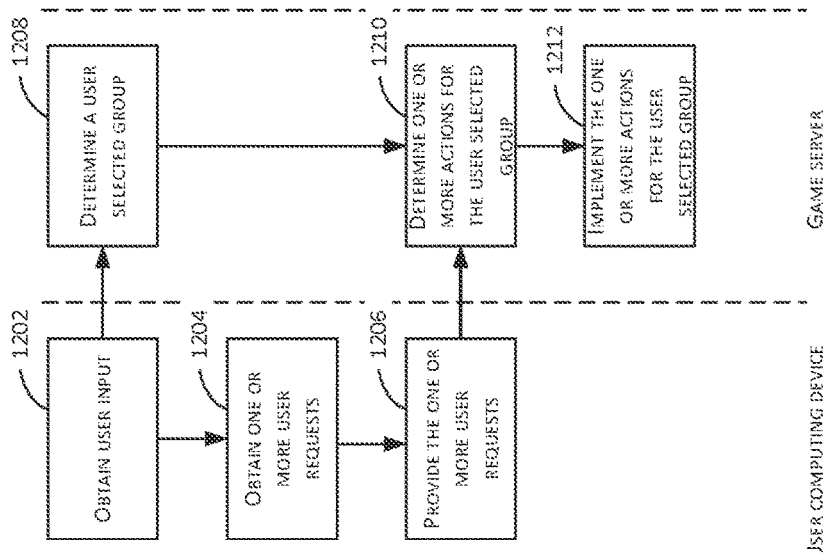
FIG. 12 illustrates an example flowchart of a method for implementing actions for a user defined group according to some embodiments herein.

FIG. 12 illustrates an example flowchart of a method for implementing actions for a user defined group according to some embodiments herein. The player may provide particular actions by interacting with the user computing device. The player may also define a particular group of characters. The game server can implement the action for each character of the group of characters. In some embodiments, the user computing device can obtain user input at 1202. Prior to obtaining the user input, the game server can determine game characters and provide corresponding character data to the user computing device. Based on the character data, the user computing device can implement one or more markers. The user input may be a modification of the markers. For example, the player may modify the markers by moving the markers and grouping markers together. The player may group markers to form character groups and may isolate markers to form an individual character group. It will be understood that a character group can include any number of characters including one character. Therefore, the user input can define groups of characters. The user input can further define a selected group or an active group. For example, the player can move a selected group into a particular location of the interface of the user computing device in order to select the group (e.g., a bottom left location of the interface of the user computing device). In some embodiments, the user computing device can obtain one or more user requests at 1204. The one or more user requests may be requests to implement one or more actions. The one or more requests may be provided as audio commands, swipes, taps, interactions with a keypad or joystick, interactions with the interface, or any other command. Further, the one or more requests may be requests for actions such as retreating, engaging in battle, opening a loot crate, healing an ally, etc. In some embodiments, the user computing device can provide the one or more user requests to the game server at 1206.

In some embodiments, the game server can determine a user selected group at 1208. The game server can determine a user selected group based on the obtained user input. The game server can further identify a plurality of groups based on the user input and identify a user selected group from the plurality of groups based on the player's interactions with the user computing device (e.g., by selecting a group or by moving a group to a particular location). For example, a player can select a particular character via one interaction with the user computing device (e.g., by a singular tap on a representation of the character) and a group associated with the particular character via another character with the user computing device (e.g., by a series of taps on a representation of a character within the group). Therefore, the player can give individual characters orders without breaking the individual characters from a group and the player can alternate between ordering a particular character and a group of characters that include the particular character or any other group. In some embodiments, the player may generate one group of characters and the user selected group may default to the one generated group. In other embodiments, the user selected group may default to a different group. In some embodiments, the game server can determine one or more actions for the user selected group at 1210. The game server can determine the one or more actions based on the one or more user requests. In some embodiments, the game server can implement the one or more actions for the user selected group at 1212. The game server can coordinate the one or more actions for each character of the user selected group. The performance and priority of the one or more actions for each character may depend upon the character traits of each character. For example, a character with a higher loyalty may perform a heal ally action with a higher priority than a character with a lower loyalty. Therefore, the player can split and recombine groups of characters to perform different actions.

Figure 13:
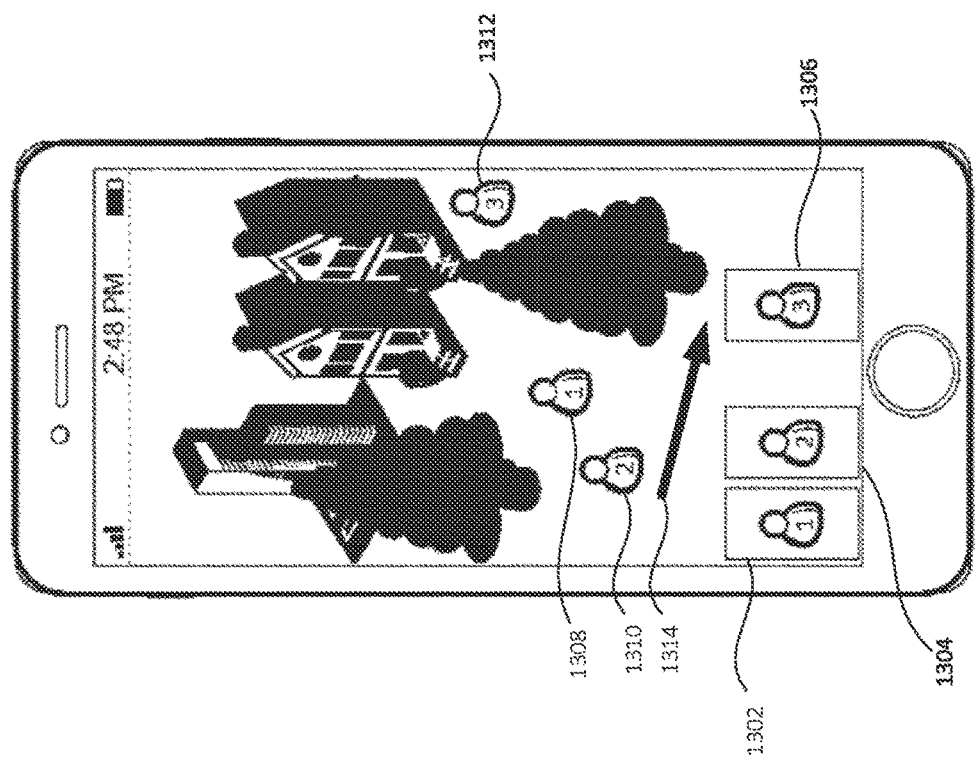
FIG. 13 is a pictorial diagram depicting a user computing device including markers for characters according to some embodiments herein.

FIG. 13 is a pictorial diagram depicting a user computing device 1300 including markers for characters according to some embodiments herein. The user computing device 1300 can provide markers for characters that may allow a player to define groups of characters. For example, a player can interact with the markers of the characters in order to define how characters are grouped. The player can utilize the markers in order to define multiple groups of characters.

The user computing device 1300 can provide an interface that includes a first marker 1302, a second marker 1304, and a third marker 1306. Each of the markers 1302, 1304, and 1306 may correspond to a card or icon located at the bottom of the interface. Each of the markers 1302, 1304, and 1306 may be selectable and/or modifiable. For example, a user can modify the position of each of the markers 1302, 1304, and 1306 by dragging and dropping one of the markers 1302, 1304, and 1306 to a new location. Further, marker 1306 may be selected and dragged such that marker 1306 is adjacent to marker 1304. Such an action may group marker 1306 with marker 1304. In order to split a group of markers, marker 1304 may be selected and dragged such that marker 1304 is no longer adjacent to marker 1302. The marker 1304 may subsequently be grouped with marker 1306 or may be grouped into an individual group. The player may combine characters into groups and split groups using a drag and drop method. Advantageously, the player may use a singular finger to drag and drop markers. Therefore, the player can interact with the user computing device 1300 in order to group markers.

Each of the markers 1302, 1304, and 1306 may correspond to a particular character within the game. For example, marker 1302 may correspond to character 1308, marker 1304 may correspond to character 1310, and marker 1306 may correspond to character 1312. Based on how each of the markers 1302, 1304, and 1306 is grouped, the characters 1308, 1310, and 1312 may also be grouped. In the example of FIG. 13, markers 1302 and 1304 are grouped together and form a first group and marker 1306 is grouped alone and forms a second group. Further, as the first group is in a bottom left location of the user computing device 1300, the first group may be considered the active group or selected group. By grouping characters, requested actions may be implemented for each character of a group. The user computing device 1300 may receive a user generated swipe 1314. As the first group of markers 1302 and 1304 is the active group, an action corresponding to the user generated swipe 1314 may be added to the list of actions for character 1308 and 1310. The priority of the action may be dependent on the character traits of each character. For example, the character 1308 may have a higher priority for the action than the character 1310 and the action may be performed by each character at different times. The player can interact with markers in order to define groups of characters and provide an action for each character of the group to perform.

10.0 Player Proxy

As the player interacts with the game, the computing device of the player may be disconnected from the game server. Aspects relate to providing a disconnected proxy player for the player. The gaming system can monitor a player's tendencies and/or behaviors. Further, the gaming system can learn a player's strategy or game plan. Based on these observed behaviors, the gaming system can, upon determining the computing device of the player has been disconnected, initiate a proxy player that continues game play for the player while disconnected. The proxy player may be based on the observed tendencies of the player. Further, while the proxy player may be based on the observed behavior of the player, the proxy player may play at a reduced level when compared to the player in order to avoid providing a gaming advantage. Upon determining the player has been reconnected, the proxy player may be stopped. Accordingly, the gaming system can implement a proxy player for a disconnected player.

Figure 14:
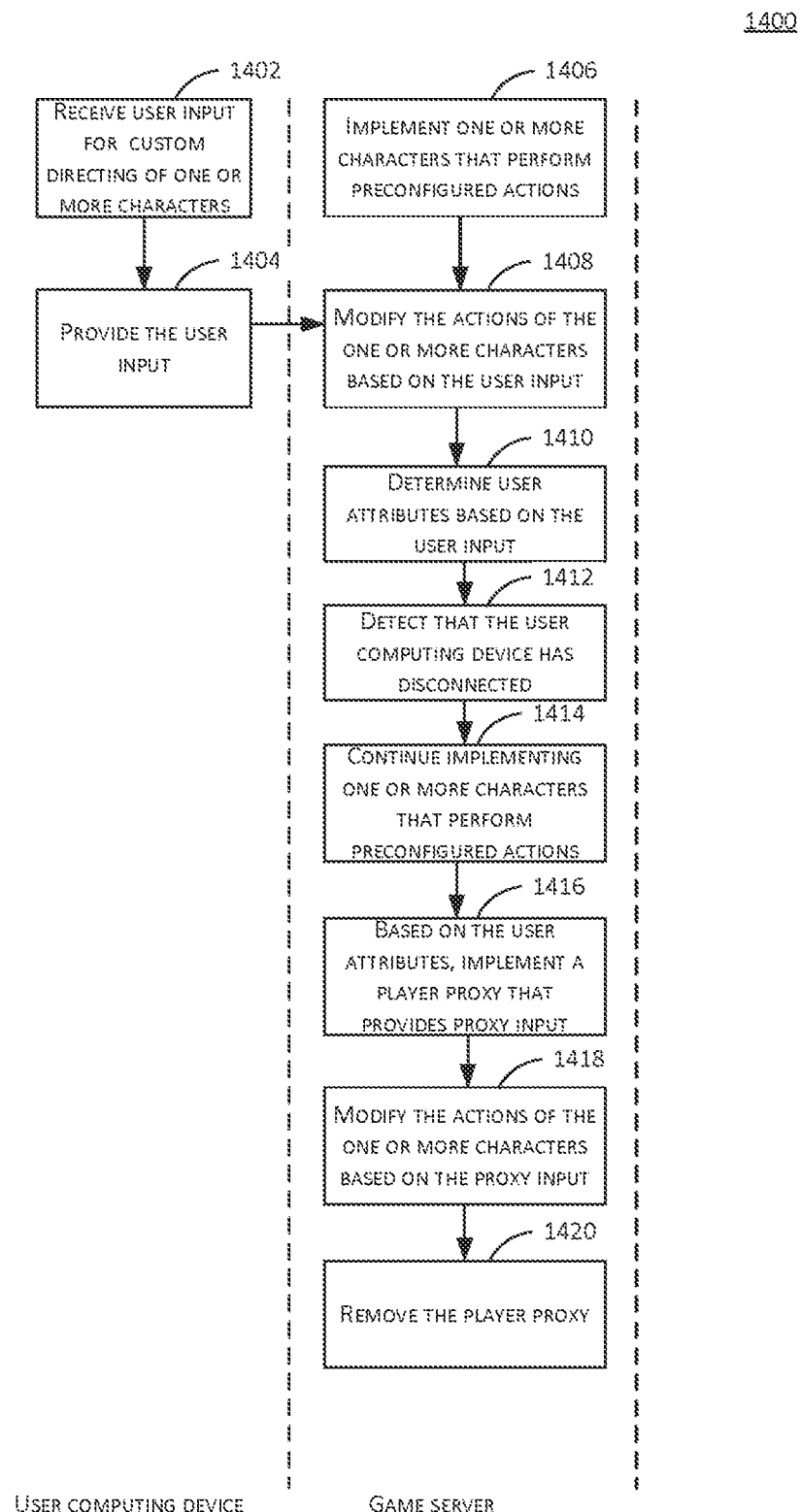
FIG. 14 illustrates an example flowchart of a method for implementing a player proxy for a player according to some embodiments herein.

FIG. 14 illustrates an example flowchart of a method 1400 for implementing a player proxy for a player according to some embodiments herein. The player may interact with the game server via the user computing device in order to implement the game. While implementing the game, the user computing device may be disconnected and the game server can instantiate a player proxy to substitute for the player.

In some embodiments, the user computing device can receive user input for custom directing of one or more characters at 1402. For example, the player may play the game and direct characters through user input. The player can provide, as user input, one or more actions to be performed by the one or more characters. In some embodiments, the user computing device can provide the user input to the game server at 1404. In some embodiments, the game server can implement one or more characters that perform preconfigured actions at 1406. The game server can implement characters that perform preconfigured actions without input from the user computing device. For example, the characters may be preconfigured to engage enemies in battle, to heal allies, to proceed to a home location, or perform any other functions. The characters may perform these actions whether or not the player is actively engaged with the game. Further, each action may be associated with a priority and a character may be associated with a list of actions sorted based on the priority of each action. In some embodiments, the game server can modify the actions of the one or more characters based on the user input at 1408. The game server can determine the priority of user provided actions and add the user provided actions to the list of actions for each character. Therefore, the user computing device can modify the performance of the characters.

In some embodiments, the game server can determine user attributes based on the user input at 1410. The game server can observe the user input and determine player behavior. Based on the observed user input, the game server can determine user attributes for the player. In some embodiments, the game server can detect that the user computing device has disconnected at 1412. The game server may detect disconnection based on not receiving a communication from the user computing device for a given time period (e.g., 20 time seconds). Further, the game server may detect disconnection based on determining that the user computing device has not replied to a query or request. In some embodiments, the game server can continue implementing the one or more characters that perform preconfigured actions at 1414. In some embodiments, based on the user attributes (e.g., behavior), the game server can implement a player proxy that provides proxy input at 1416. In some embodiments, the player proxy may be a generic player proxy. In other embodiments, the player proxy may be based on one or more identified data points (e.g., any identifiable data associated with the game such as player game data) such as special events, a time of year, weather, a location, etc. For example, if the game indicates a particular time of year (e.g., a Tuesday in February), a particular location (Texas), and/or a particular weather (snowing), a particular player proxy may be implemented (e.g., a hyper aggressive, slow to react player proxy) based on the identified data points. As the player proxy is based on the user attributes, the player proxy may interact with the game in a similar manner as the player. For example, if the player is particularly aggressive, deliberate, calculated, a VIP, etc., the player proxy may share these traits. Further, if the player is an aggressive player, an aggressive player proxy may be implemented. If the player is a premium player (e.g., a VIP), the player may have access to a special perk that makes the player proxy perform more strategically and a strategic player proxy may be implemented. Therefore, the proxy input may be similar to the user input. In some embodiments, the game server can modify the actions of the one or more characters based on the proxy input at 1418. In some embodiments, the player proxy may correspond to a weaker version of the player (e.g., the player proxy may occasionally deviate from the identified user attributes, may assign erroneous actions, may freeze, or may otherwise alter the proxy input so that it does not perform as good as the proxy input). In some embodiments, the game server can remove the player proxy at 1420. The game server may remove the player proxy based on determining the user computing device has reconnected (e.g., by receiving a communication from the user computing device). The game server can implement a player proxy for a player in the event that a user computing device is disconnected.

11.0 Search Nodes

Aspects relate to managing search nodes in order to discover a map or territory. Characters that are not being currently utilized may be designated agents and may be instructed to search an area in order to discover information about the area. Each area may include one or more search nodes and each character may be provided with a list of unvisited, available search nodes. Based on class bias and distance to the search node, each character may determine a search node to visit. Upon entering the radius of the search node, the character may mark the search node as visited and proceed to a next search node. Accordingly, the use of agents and search nodes can enable a character and, therefore, a player, to discover an area or a territory of the game.

Figure 15:
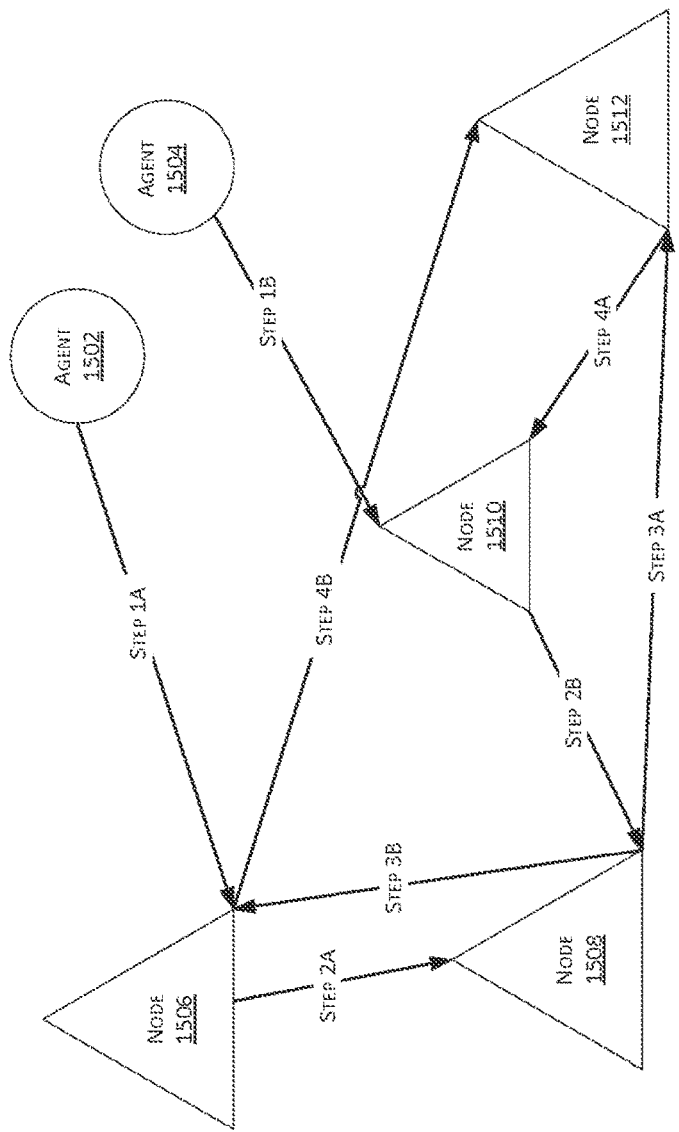
FIG. 15 is a pictorial diagram depicting a series of search nodes and agents according to some embodiments herein.

FIG. 15 is a pictorial diagram depicting a series of search nodes and agents according to some embodiments herein. The diagram may illustrate a map 1500 that includes the series of search nodes and agents. The game server can provide directional searches to agents to gain additional information about a map 1500. The agents may determine additional information about a map 1500 by interacting with search nodes in the territory. Agents can be used to perform various search patterns and/or to search particular areas of a map 1500 and learn information about the map 1500.

The map 1500 includes agents 1502 and 1504. Each of the agents 1502 and 1504 may be present in the game world. Further, each agent 1502 and 1504 may not be currently in combat and may, therefore, be eligible to participate in the searching process. The agents 1502 and 1504 can traverse a map in order to learn about the map 1500 (e.g., find additional search nodes, find intractable, find enemies, identify tactical advances, etc.). The map 1500 may be instrumented with a plurality of search nodes 1506, 1508, 1510, and 1512. Each search node 1506, 1508, 1510, and 1512 may be associated with a radius and a class bias that affects an agent's priority to visit a particular search node. The radius may identify, for a particular search node, how close an agent has to be to the search node to visit the node. Once the agent enters the radius of a search node, the agent may consider the search node to be visited. Therefore, an agent need not be headed towards a particular search node to visit the search node, instead, the agent may pass through the radius of a first search node on the way to a second search node and visit the first search node. The class bias for a particular search node may be based on the class of a character. For example, a search node may define a first class bias for an assault character and a second class bias for a heavy character. This can enable characters to split up or prioritize different areas of the map. In some embodiments, a search node may have the same class for each type of character. The class bias may indicate a likelihood that a character will visit the search node. For example, the class bias may be a number within a particular range (e.g., 0 to 1) with particular numbers indicating a high likelihood to visit (e.g., 1) and other number indicating a low likelihood to visit (e.g., 0). Based on the distance to the search node and the class bias for each search node 1506, 1508, 1510, and 1512, each agent may generate a list of search nodes 1506, 1508, 1510, and 1512 and an order in which to visit the search nodes 1506, 1508, 1510, and 1512. Based on the order to visit the search nodes, a search node pattern may be generated. The search node pattern may include one or more search patterns such as spirals, spidering out, etc.

Based on the list of search nodes 1506, 1508, 1510, and 1512 and the order in which to visit the search nodes 1506, 1508, 1510, and 1512, the agent 1502 may visit node 1506 in a step 1A, node 1508 in a step 2A, node 1512 in a step 3A, and node 1510 in a step 4A. Further, the agent 1504 may visit node 1510 in a step 1B, node 1508 in a step 2B, node 1506 in a step 3B, and node 1512 in a step 4B. The search node paths of the agent 1502 and the 1504 may be different based on the starting location of each agent. Further, the agent 1502 and the 1502 may be different classes of characters and may therefore be associated with different class biases. Therefore, agents can visit a path of search nodes based on a class bias and the distance between the agents and each search node.

Figure 16:
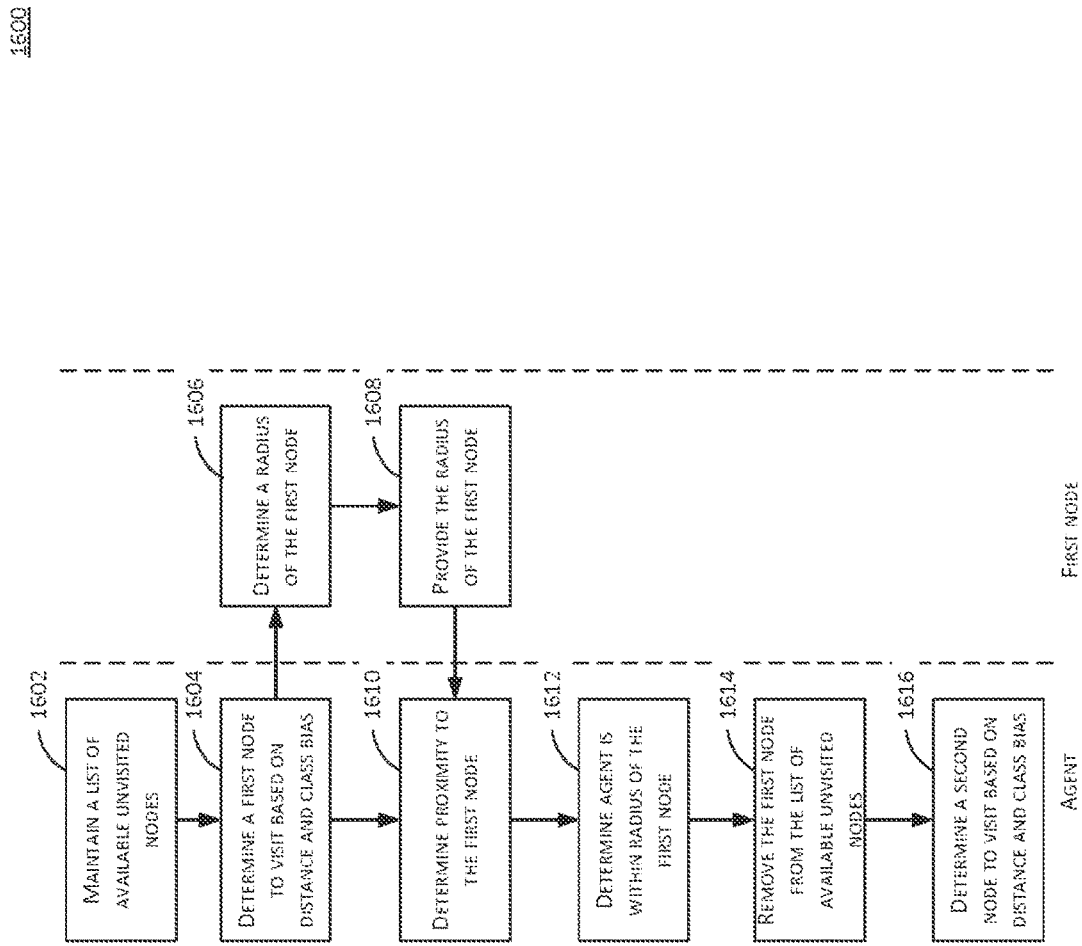
FIG. 16 illustrates an example flowchart for a method for visiting search nodes by agents according to some embodiments herein.

FIG. 16 illustrates an example flowchart for a method 1600 for visiting search nodes by agents according to some embodiments herein. An agent may obtain a list of search nodes to visit and may prioritize the list of search nodes to determine a search node path. Based on the search node path, the agent can visit the search nodes.

In some embodiments, the agent can maintain a list of available unvisited nodes at 1602. The list of available unvisited nodes may correspond to nodes that are currently available within the map. Further, the list of available unvisited nodes may correspond to nodes that have been visited by the agent. Each node may have one or more class biases. For example, the class bias may be based on the class of the agent and may be a number within a range (e.g., 0 to 1). The higher the class bias, the more likely an agent is to visit a node next. In some embodiments, the lower the class bias, the more likely an agent is to visit a node next. Each node may further be associated with a distance from the agent to the node. In some embodiments, the distance may correspond to a number within a range (e.g., 0 to 10) where a large number indicates a large distance and a small number indicates a small distance. In other embodiments, the distance may correspond to an actual distance between the node and the agent. The agent may calculate a cost for each node. The cost may be equal to the distance divided by the class bias. For example, a first node with a distance of 10 and a class bias of 2 may have a cost of 5 and a second node with a distance of 6 and a class bias of 1 may have a cost of 6. The agent may select the node with the lowest associated cost to visit next (in the above example, the first node). In some embodiments, the agent can determine a first node to visit based on distance and class bias at 1604. The agent can determine the first node by comparing the cost (e.g., the distance and class bias) for each node and choosing a node with the lowest cost. In some embodiments, the agent may elect to visit a node that is further away based on the class bias. In other embodiments, if the class bias is below or equal to zero, the agent may never visit the particular search node. In some embodiments, the first node may determine a radius of the first node at 1606. The radius may indicate a distance from the first node that an agent must be to have visited the node. Each node may have a different radius. In some embodiments, one or more nodes may share the same radius. In some embodiments, the first node can provide the radius of the first node to the agent at 1608.

In some embodiments, the agent can determine a proximity to the first node at 1610. For example, the agent can determine a distance from the agent to the first node. In some embodiments, the agent can determine the agent is within the radius of the first node at 1612. The agent may repeat the process by determining the proximity to the first node until the agent is within the radius of the first node. In some embodiments, the agent can remove the first node from the list of available unvisited nodes at 1614. Removing the first node from the list of available unvisited nodes may be based on determining that agent is within the radius of the first node. In some embodiments, the agent can determine a second node to visit based on distance and class bias at 1616. The agent can therefore evaluate a next node to visit based on the list of available unvisited nodes. The agent can visit a series of search nodes based on class biases and distances from the agent to the search nodes.

12.0 Additional Embodiments

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Although certain preferred embodiments and examples are disclosed, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Certain exemplary embodiments are described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments.

Such modifications and variations are intended to be included within the scope of the present technology.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will also be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein, but are to be accorded the widest scope consistent with this disclosure, the principles and the novel features disclosed herein.

What is claimed is:

1. A monitoring system comprising:
one or more processors; and
a computer-readable storage medium including machine-readable instructions that, when executed by the one or more processors, cause the one or more processors to execute an application corresponding to a game, wherein the game is executed based at least in part on game data stored by a game database, the application configured to:
monitor a third-party platform for a plurality of communications between one or more first user computing devices and one or more second user computing devices, wherein the plurality of communications are posted to the third-party platform;
parse the plurality of communications to identify a first subset of the plurality of communications associated with the game and a second subset of the plurality of communications not associated with the game;
determine one or more communications of the first subset of the plurality of communications satisfy one or more qualifications for modifying the game data stored by the game database based at least in part on parsing the plurality of communications, wherein the one or more communications of the first subset of the plurality of communications comprise a request from a plurality of users to implement a multiplayer event, and wherein the one or more communications define the plurality of users as a plurality of players for the multiplayer event;
identify one or more service calls based at least in part on the one or more communications;
validate that the application is authorized to instruct performance of the one or more service calls;
generate one or more validated service calls from the one or more service calls based at least in part on validating that the application is authorized to instruct performance of the one or more service calls; and
route, to an interface of the game database, the one or more validated service calls, wherein the interface of the game database modifies at least a portion of the game data stored by the game database based at least in part on the one or more validated service calls and initializes the multiplayer event.

2. The monitoring system of claim 1, wherein the one or more communications comprise one or more first communications, wherein the application is further configured to determine one or more second communications of the first subset of the plurality of communications do not satisfy the one or more qualifications for modifying the game data stored by the game database.

3. The monitoring system of claim 1, wherein, to parse the plurality of communications to identify the first subset of the plurality of communications associated with the game, the application is further configured to determine the first subset of the plurality of communications is associated with the game based at least in part on one or more of a tag, a reference, a link, a phrase, or a term associated with the first subset of the plurality of communications.

4. The monitoring system of claim 1, wherein the third-party platform comprises a chat platform.

5. The monitoring system of claim 1, wherein the third-party platform comprises a social media platform.

6. The monitoring system of claim 1, wherein the third-party platform is associated with a plurality of groups, wherein the application is further configured to:
   determine a first group of the plurality of groups is associated with the game; and
   determine a second group of the plurality of groups is not associated with the game, wherein, to monitor the third-party platform, the application is further configured to monitor communications associated with the first group based at least in part on determining the first group is associated with the game and not monitor communications associated with the second group based at least in part on determining the second group is not associated with the game.

7. The monitoring system of claim 1, wherein the interface of the game database modifies the at least a portion of the game data stored by the game database to implement one or more additional events, the one or more additional events comprising at least one of:
   a resource event;
   a player event;
   a character removal event; or
   a character generation event.

8. The monitoring system of claim 1, wherein the one or more validated service calls specify at least one of:
   an event type of the multiplayer event;
   completion criteria associated with the multiplayer event;
   a location of the multiplayer event;
   a reward associated with the multiplayer event;
   a length of the multiplayer event;
   the plurality of users for participation in the multiplayer event; or
   a second plurality of users not for participation in the multiplayer event.

9. The monitoring system of claim 1, wherein the application is further configured to:
   compare the one or more service calls to a plurality of service calls;
   determine the one or more service calls are recognized service calls based at least in part on comparing the one or more service calls to a plurality of service calls; and
   validate the one or more service calls based at least in part on determining the one or more service calls are recognized service calls, wherein, to generate the one or more validated service calls, the application is further configured to generate the one or more validated service calls further based at least in part on validating the one or more service calls.

10. The monitoring system of claim 1, wherein the application is further configured to:
    determine voting information associated with the one or more service calls;
    compare the voting information to one or more voting threshold values associated with the game;
    determine the voting information satisfies the one or more voting threshold values based at least in part on comparing the voting information to one or more voting threshold values; and
    validate the one or more service calls based at least in part on determining the voting information satisfies the one or more voting threshold values, wherein, to generate the one or more validated service calls, the application is further configured to generate the one or more validated service calls further based at least in part on validating the one or more service calls.

11. The monitoring system of claim 1, wherein, to monitor the third-party platform, the application is further configured to monitor at least one of:
    chats;
    posts;
    comments; or
    image data.

12. The monitoring system of claim 1, wherein the one or more service calls comprise one or more first service calls, wherein the application is further configured to:
    identify one or more second service calls related to the one or more first service calls;
    determine a number of the one or more second service calls;
    determine the number of the one or more second service calls satisfies one or more threshold values; and
    validate the one or more first service calls based at least in part on determining the number of the one or more second service calls satisfies the one or more threshold values, wherein, to generate the one or more validated service calls, the application is further configured to generate the one or more validated service calls further based at least in part on validating the one or more first service calls.

13. The monitoring system of claim 1, wherein to modify the at least a portion of the game data stored by the game database, the interface of the game database is configured to at least one of:
    remove, from the game database, the at least a portion of the game data stored by the game database; or
    add, to the game database, a modified version of the at least a portion of the game data stored by the game database.

14. The monitoring system of claim 1, wherein the application is further configured to:
    translate the one or more service calls from a first format to a second format.

15. The monitoring system of claim 1, wherein the application is further configured to:
    translate the one or more service calls from a first code language to a second code language to generate one or more translated service calls, wherein, to validate that the application is authorized to instruct performance of the one or more service calls, the application is further configured to validate that the application is authorized to instruct performance of the one or more translated service calls.

16. The monitoring system of claim 1, wherein the application is further configured to:
    translate the one or more validated service calls from a first code language to a second code language to generate one or more translated service calls, wherein, to route the one or more validated service calls, the application is further configured to route the one or more translated service calls, wherein the first code language is associated with the third-party platform and the second code language is associated with the interface of the game database.

17. The monitoring system of claim 1, wherein the one or more service calls comprise one or more user requests.

18. The monitoring system of claim 1, wherein the application is authorized to cause a first set of game data modifications and is not authorized to cause a second set of game data modifications, wherein, to validate that the application is authorized to instruct performance of the one or more service calls, the application is configured to determine the one or more service calls correspond to the first set of game data modifications, and wherein the interface of the game database modifies the at least a portion of the game data stored by the game database based at least in part on determining the one or more validated service calls correspond to the first set of game data modifications.

19. A computer-implemented method comprising:
as implemented by an interactive computing system configured with specific computer-executable instructions during runtime of an application corresponding to a game, wherein the game is executed based at least in part on game data stored by a game database,
monitoring a third-party platform for a plurality of communications between one or more first user computing devices and one or more second user computing devices, wherein the plurality of communications are posted to the third-party platform;
parsing the plurality of communications to identify a first subset of the plurality of communications associated with the game and a second subset of the plurality of communications not associated with the game;
determining one or more communications of the first subset of the plurality of communications satisfy one or more qualifications for modifying the game data stored by the game database based at least in part on parsing the plurality of communications, wherein the one or more communications of the first subset of the plurality of communications comprise a request from a plurality of users to implement a multiplayer event, and wherein the one or more communications define the plurality of users as a plurality of players for the multiplayer event;
identifying one or more service calls based at least in part on the one or more communications;
validating that the application is authorized to instruct performance of the one or more service calls;
generating one or more validated service calls from the one or more service calls based at least in part on validating that the application is authorized to instruct performance of the one or more service calls; and
routing, to an interface of the game database, the one or more validated service calls, wherein the interface of the game database modifies at least a portion of the game data stored by the game database based at least in part on the one or more validated service calls and initializes the multiplayer event.

20. A non-transitory computer-readable medium storing computer-executable instructions that, when executed by one or more computing devices, configure the one or more computing devices to execute an application corresponding to a game, wherein the game is executed based at least in part on game data stored by a game database, the application configured to:
monitor a third-party platform for a plurality of communications between one or more first user computing devices and one or more second user computing devices, wherein the plurality of communications are posted to the third-party platform;
parse the plurality of communications to identify a first subset of the plurality of communications associated with the game and a second subset of the plurality of communications not associated with the game;
determine one or more communications of the first subset of the plurality of communications satisfy one or more qualifications for modifying the game data stored by the game database based at least in part on parsing the plurality of communications, wherein the one or more communications of the first subset of the plurality of communications comprise a request from a plurality of users to implement a multiplayer event, and wherein the one or more communications define the plurality of users as a plurality of players for the multiplayer event;
identify one or more service calls based at least in part on the one or more communications;
validate that the application is authorized to instruct performance of the one or more service calls;
generate one or more validated service calls from the one or more service calls based at least in part on validating that the application is authorized to instruct performance of the one or more service calls; and
route, to an interface of the game database, the one or more validated service calls, wherein the interface of the game database modifies at least a portion of the game data stored by the game database based at least in part on the one or more validated service calls and initializes the multiplayer event.

* * * * *